US 9,735,660 B2

(12) United States Patent
Shibata et al.

(10) Patent No.: US 9,735,660 B2
(45) Date of Patent: Aug. 15, 2017

(54) ROTARY ELECTRIC MACHINE

(71) Applicant: JTEKT CORPORATION, Osaka-shi, Osaka (JP)

(72) Inventors: Yoshiyuki Shibata, Toyota (JP); Yutaka Mori, Toyohashi (JP)

(73) Assignee: JTEKT CORPORATION, Osaka-shi (JP)

( * ) Notice: Subject to any disclaimer, the term of this patent is extended or adjusted under 35 U.S.C. 154(b) by 519 days.

(21) Appl. No.: 14/249,640

(22) Filed: Apr. 10, 2014

(65) Prior Publication Data
US 2014/0312730 A1    Oct. 23, 2014

(30) Foreign Application Priority Data

Apr. 17, 2013   (JP) ................................ 2013-086785

(51) Int. Cl.
| H02K 21/02 | (2006.01) |
| H02K 21/16 | (2006.01) |
| H02K 16/02 | (2006.01) |
| H02K 1/27 | (2006.01) |

(52) U.S. Cl.
CPC ........... H02K 21/029 (2013.01); H02K 1/276 (2013.01); H02K 16/02 (2013.01); H02K 21/16 (2013.01)

(58) Field of Classification Search
CPC ...... H02K 16/02; H02K 1/276; H02K 21/029; H02K 21/16
USPC ........................................................ 310/191
See application file for complete search history.

(56) References Cited

U.S. PATENT DOCUMENTS

| 5,818,131 A * | 10/1998 | Zhang .................... B63H 11/08 128/DIG. 3 |
| 7,002,274 B2 * | 2/2006 | Kim ...................... H02K 21/029 310/114 |
| 7,671,494 B2 * | 3/2010 | Shibukawa ............ H02K 1/278 310/190 |

(Continued)

FOREIGN PATENT DOCUMENTS

| DE | 10 2008 044954 A1 | 8/2009 |
| EP | 1 387 472 A2 | 2/2004 |

(Continued)

OTHER PUBLICATIONS

Krasser, B. et al., "Mechanical Field Weakening With Actuation by the Stator Currents," 8th European Conference on Power Electronics and Applications, Sep. 7, 1999, pp. 1-10.

(Continued)

Primary Examiner — Alex W Mok
(74) Attorney, Agent, or Firm — Oliff PLC

(57) ABSTRACT

A rotary electric machine includes: a stator; a rotor; a control device that causes the stator to generate a rotating magnetic field; and a magnetic flux supply element supported by a rotary shaft so as to be rotatable relative to the rotary shaft, disposed radially inward of the rotor across a gap, and having auxiliary magnets. Each auxiliary magnet is formed such that opposite end portions thereof in the circumferential direction are radially opposed to holding magnets when the relative rotation angle of the magnetic flux supply element is a strengthening angle. The control device executes field weakening control or field strengthening control, thereby changing the relative rotation angle of the magnetic flux supply element.

8 Claims, 16 Drawing Sheets

(56) References Cited

U.S. PATENT DOCUMENTS

| | | | | |
|---|---|---|---|---|
| 2003/0057793 A1* | 3/2003 | Yang | .............. | H02K 7/06 |
| | | | | 310/191 |
| 2007/0188036 A1* | 8/2007 | Shibukawa | ............ | H02K 1/278 |
| | | | | 310/113 |
| 2008/0036330 A1* | 2/2008 | Abe | .............. | H02K 16/00 |
| | | | | 310/268 |
| 2008/0040015 A1 | 2/2008 | Fujishiro et al. | | |
| 2011/0304235 A1 | 12/2011 | Hashiba et al. | | |
| 2013/0020893 A1* | 1/2013 | Bradley | ............ | H02K 1/278 |
| | | | | 310/90 |

FOREIGN PATENT DOCUMENTS

| | | |
|---|---|---|
| EP | 1 833 147 A2 | 9/2007 |
| EP | 1 990 896 A1 | 11/2008 |
| JP | 2002-204541 A | 7/2002 |
| JP | 2004-072978 A | 3/2004 |
| JP | 2007-110776 A | 4/2007 |
| JP | 2008-037351 A | 2/2008 |
| JP | B2-4225001 | 2/2009 |
| JP | A-2010-233346 | 10/2010 |

OTHER PUBLICATIONS

Mar. 10, 2016 extended Search Report issued in European Patent Application No. 14164653.9.
Feb. 1, 2017 Office Action issued in Japanese Patent Application No. 2013-086785.

* cited by examiner

WEAKENING ANGLE

STRENGTHENING ANGLE

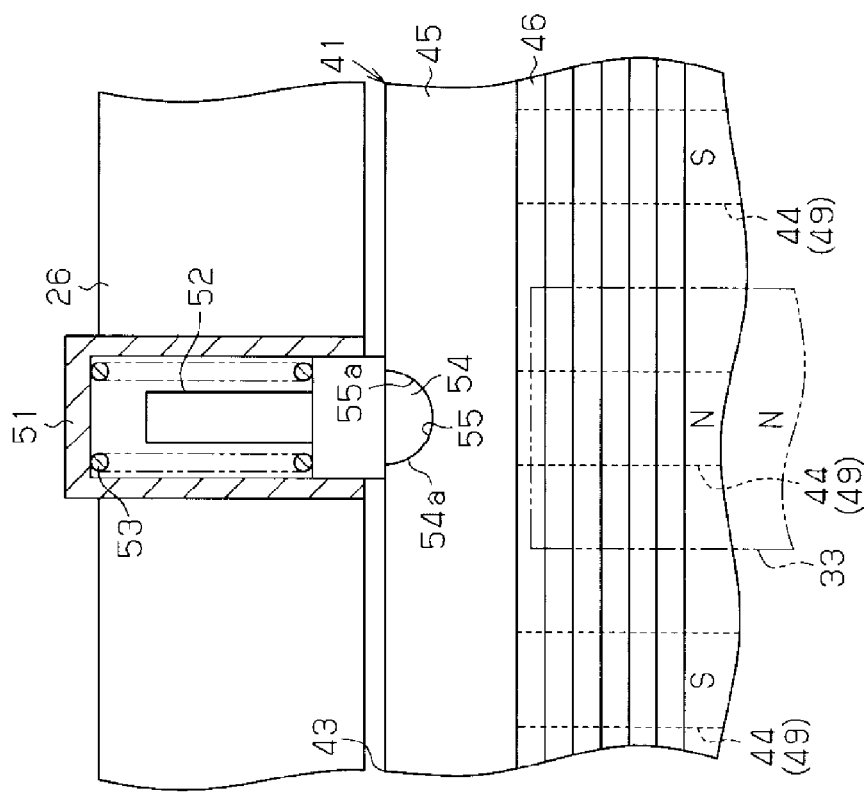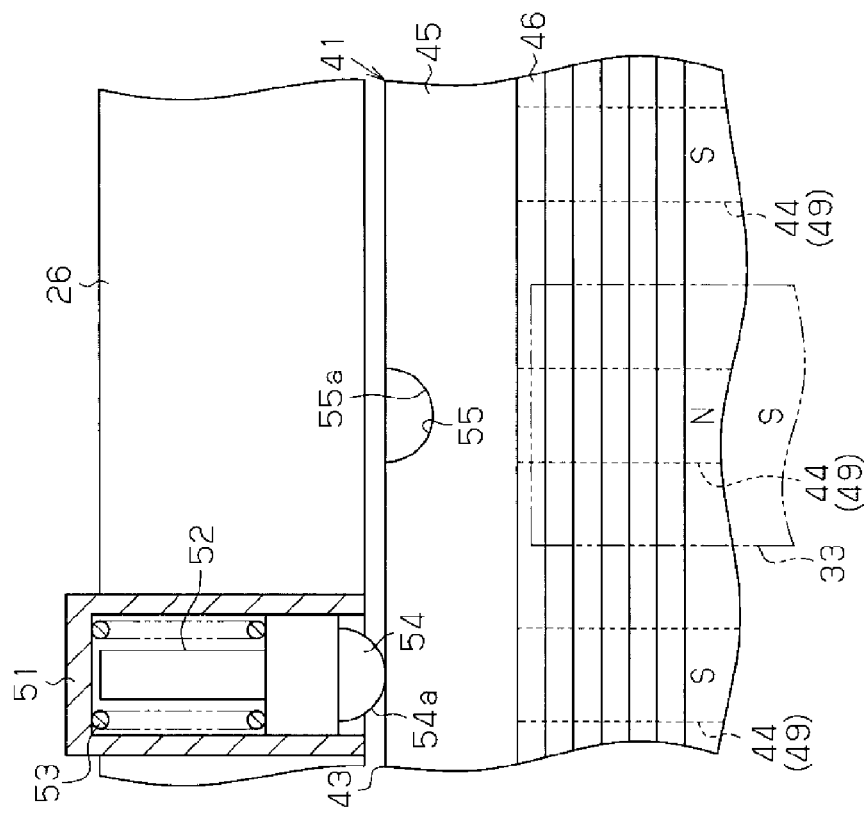

FIG.11

ROTARY ELECTRIC MACHINE

INCORPORATION BY REFERENCE

The disclosure of Japanese Patent Application No. 2013-086785 filed on Apr. 17, 2013 including the specification, drawings and abstract, is incorporated herein by reference in its entirety.

BACKGROUND OF THE INVENTION

1. Field of the Invention

The invention relates to a rotary electric machine

2. Description of the Related Art

Some rotary electric machines include a so-called magnet embedded rotor in which permanent magnets are fixedly embedded in a rotor core, as described in, for example, Japanese Patent Application Publication No. 2010-233346 (JP 2010-233346 A). In such a rotary electric machine, the amount of magnetic flux generated by the permanent magnets is usually substantially constant, and thus the amount of magnetic flux of the rotor is also substantially constant. Thus, the induced voltage (counter electromotive voltage) generated at coils of a stator increases in proportion to the rotational speed of the rotor. When the induced voltage reaches the upper limit of power-supply voltage, it is no longer possible to further increase the rotational speed of the rotor. Therefore, a rotary electric machine may be designed such that the amount of magnetic flux of the rotor is suppressed to an amount at which the rotor is able to rotate at a sufficiently high speed. However, in this case, it is not possible to obtain sufficiently high torque in a low-speed rotation range.

In recent years, there has been proposed a rotary electric machine that is able to rotate at high speed and output high torque in the low-speed rotation range by varying the amount of magnetic flux of a rotor, as described in, for example, Japanese Patent No. 4225001. The rotary electric machine described in Japanese Patent No. 4225001 includes: a rotor having an inner rotor that holds first permanent magnets and an outer rotor that is located radially outward of the inner rotor and that holds multiple pairs of second permanent magnets; and a rotor phase control mechanism that changes the phase (rotation angle) of the outer rotor relative to the inner rotor in the rotational direction. The rotor phase control mechanism controls the phase of the outer rotor to make the polarity of a magnetic pole of each first permanent magnet and the polarity of a rotor magnetic pole that is formed of a pair of second permanent magnets and that is opposed in the radial direction to the magnetic pole of the first permanent magnet opposite to each other, thereby reducing the amount of magnetic flux of the rotor and thus allowing the rotor to rotate at high speed. On the other hand, the rotor phase control mechanism controls the phase of the outer rotor to make the polarity of a magnetic pole of each first permanent magnet and the polarity of a rotor magnetic pole that is formed of a pair of second permanent magnets and that is opposed in the radial direction to the magnetic pole of the first permanent magnet coincide with each other, thereby increasing the amount of magnetic flux of the rotor and thus allowing the rotor to output high torque.

In the rotary electric machine described in Japanese Patent No. 4225001, an oscillating motor, which is used as the rotor phase control mechanism, is incorporated in the rotor, and the phase of the outer rotor is controlled through the operation of the oscillating motor. Therefore, it is inevitable that the configuration of the rotary electric machine becomes complicated. In this regard, there is still room for improvement.

SUMMARY OF THE INVENTION

One object of the invention is to provide a rotary electric machine having a simple configuration and capable of rotating at high speed and outputting high torque in a low-speed rotation range.

An aspect of the invention relates to a rotary electric machine including: a rotor including a rotor core fixed to a rotary shaft so as to be rotatable together with the rotary shaft, and multiple pairs of embedded magnets fixedly embedded in the rotor core and magnetized such that magnetic poles of the embedded magnets in each pair, the magnetic poles being opposed to each other in a circumferential direction of the rotor, have the same polarity; a stator including a stator core having teeth opposed to rotor magnetic pole portions each interposed between one of the pairs of the embedded magnets of the rotor core, and coils wound around the teeth; a control device that causes the stator to generate a rotating magnetic field by supplying electric power to the coils; and a magnetic flux supply element supported by the rotary shaft so as to be rotatable relative to the rotary shaft, and having supply element magnetic pole portions formed by auxiliary magnets fixed to the magnetic flux supply element. In the rotary electric machine, a relative rotation angle of the magnetic flux supply element relative to the rotor during rotation of the rotor is allowed to be held at a weakening angle at which a polarity of each of the rotor magnetic pole portions and a polarity of the supply element magnetic pole portion opposed to the rotor magnetic pole portion are opposite to each other, and allowed to be held at a strengthening angle at which the polarity of each of the rotor magnetic pole portions and the polarity of the supply element magnetic pole portion opposed to the rotor magnetic pole portion coincide with each other, and the control device controls a d-axis current that is a current in a direction of a magnetic flux of the rotor to change the relative rotation angle of the magnetic flux supply element.

According to the aspect described above, when the relative rotation angle of the magnetic flux supply element is the weakening angle, the polarity of each of the rotor magnetic pole portions and the polarity of the supply element magnetic pole portion opposed to the rotor magnetic pole portion are opposite to each other. Thus, part of the magnetic flux generated by the embedded magnets does not flow between the stator and the rotor, and flows between the rotor and the magnetic flux supply element. As a result, the amount of magnetic flux of the rotor (interlinkage flux with respect to the coils) decreases, and thus, the rotor is allowed to rotate at high speed. On the other hand, when the relative rotation angle of the magnetic flux supply element is the strengthening angle, the polarity of each of the rotor magnetic pole portions and the polarity of the supply element magnetic pole portion opposed to the rotor magnetic pole portion coincide with each other. Thus, the magnetic flux generated by the auxiliary magnets is added to the magnetic flux generated by the embedded magnet and flowing between the stator and rotor. As a result, the amount of magnetic flux of the rotor increases, and the rotary electric machine is allowed to output high torque.

In this state, if the field weakening control is executed by controlling the d-axis current, the amount of magnetic flux flowing between the stator and the rotor decreases. Therefore, when the field weakening control is executed, the relative rotation angle of the magnetic flux supply element is stably held at the weakening angle at which the amount of magnetic flux of the rotor decreases. Therefore, when the field weakening control is executed in the case where the relative rotation angle of the magnetic flux supply element is the strengthening angle, the relative rotation angle of the magnetic flux supply element is changed to the weakening angle. On the other hand, when the field strengthening control is executed by controlling the d-axis current, the amount of magnetic flux flowing between the stator and the rotor increases. Therefore, when the field strengthening is executed, the relative rotation angle of the magnetic flux supply element is stably held at the strengthening angle at which the amount of magnetic flux of the rotor increases. Therefore, when the field strengthening control is executed in the case where the relative rotation angle of the magnetic flux supply element is the weakening angle, the relative rotation angle of the magnetic flux supply element is changed to the strengthening angle. With the configuration described above, the relative rotation angle of the magnetic flux supply element can be changed by executing the field weakening control or the field strengthening control through the control of the d-axis current that is supplied to the coils of the stator. Therefore, it is not necessary to additionally provide a structure for changing the relative rotation angle of the magnetic field supply element, and the configuration of the rotary electric machine is simplified.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 10A is a view schematically illustrating the vicinity of a holding structure in the case where the relative rotation angle of a magnetic flux supply element in the third embodiment is a weakening angle;

FIG. 10B is a view schematically illustrating the vicinity of the holding structure in the case where the relative rotation angle of the magnetic flux supply element in the third embodiment is a strengthening angle;

FIG. 11 is a sectional view of a rotary electric machine according to a fourth embodiment of the invention, taken along the axial direction of the rotary electric machine;

DETAILED DESCRIPTION OF EMBODIMENTS

Figure 1:
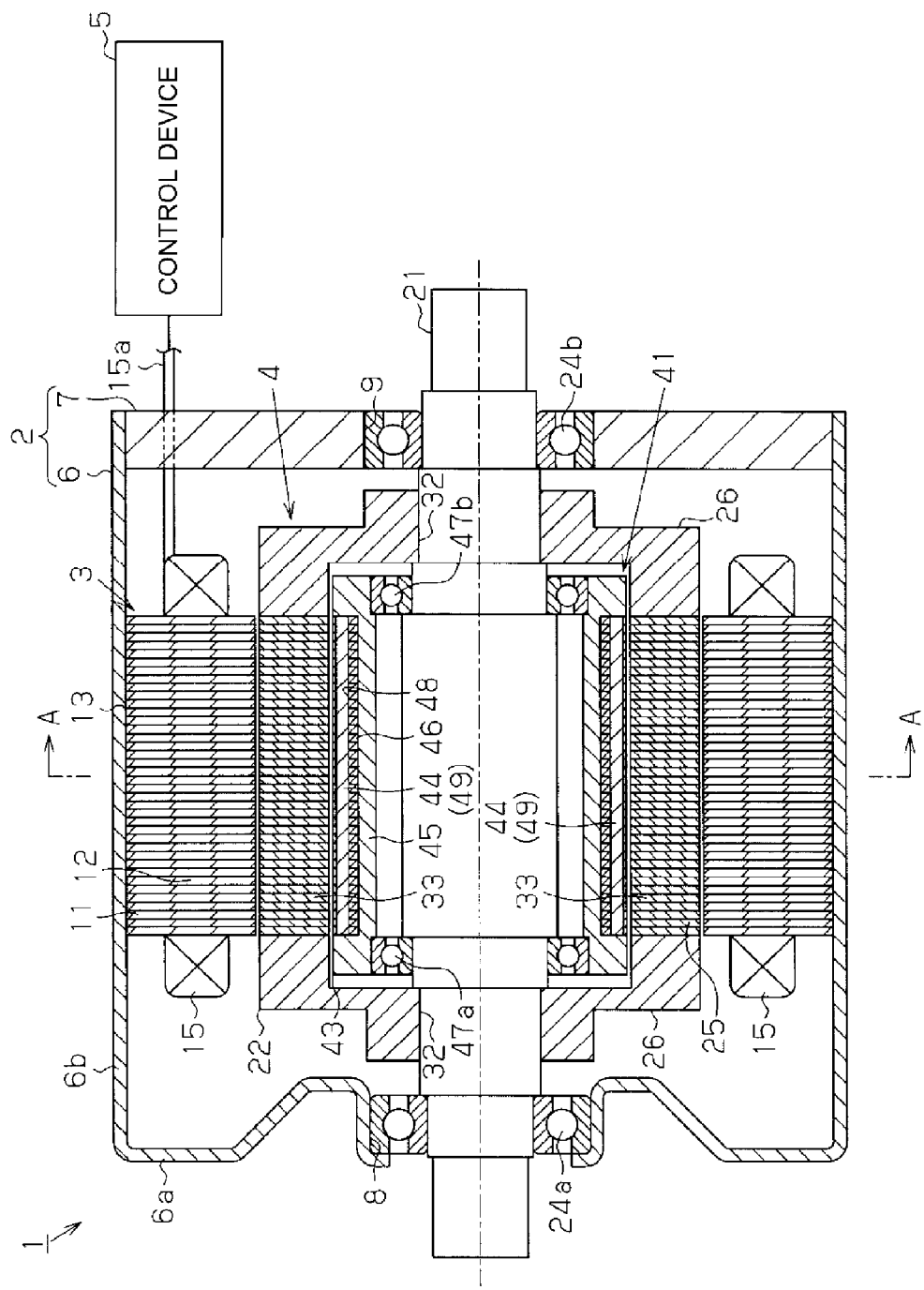
FIG. 1 is a sectional view of a rotary electric machine according to a first embodiment of the invention, taken along the axial direction of the rotary electric machine.
Figure 2:
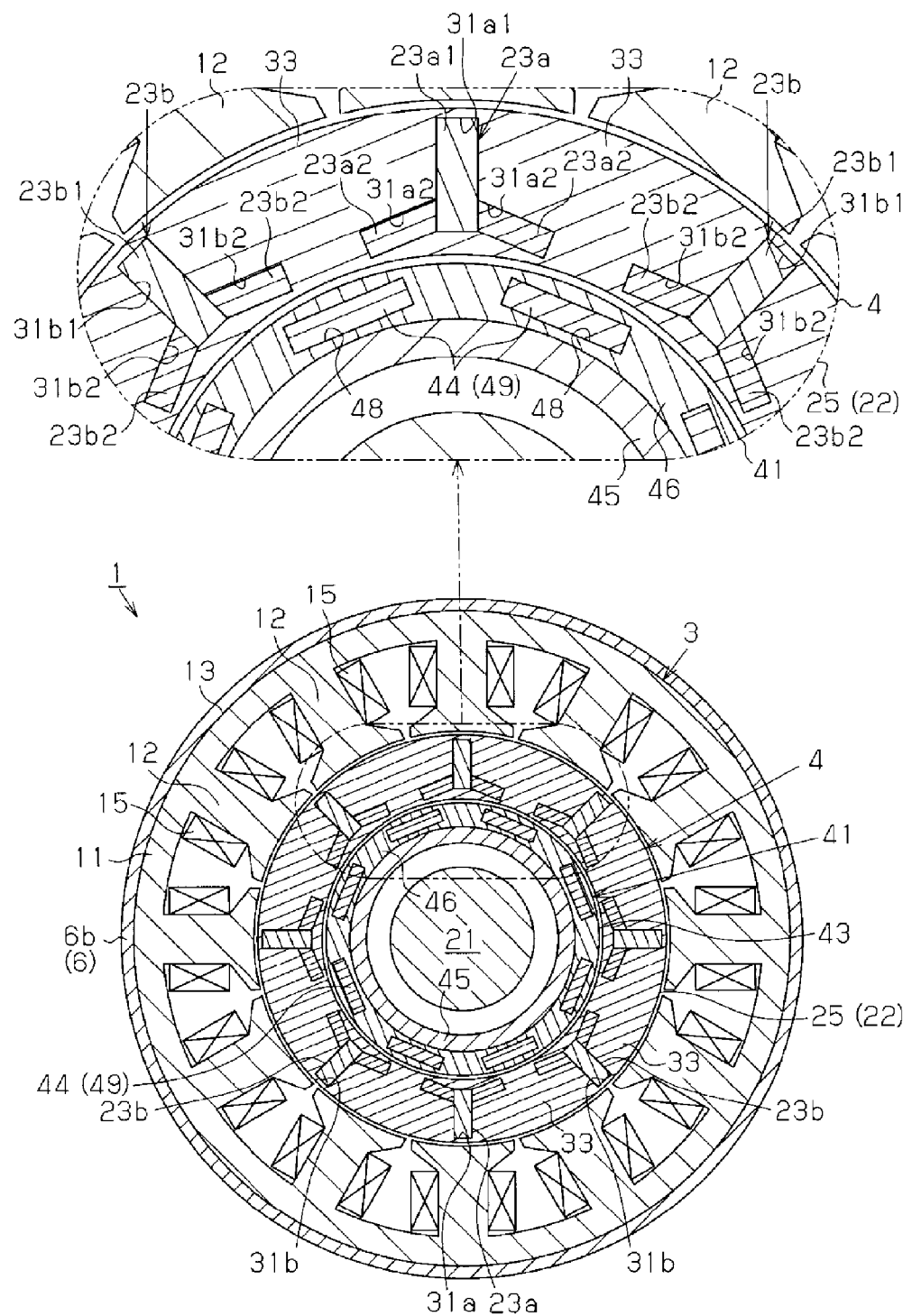
FIG. 2 is a sectional view of the rotary electric machine according to the first embodiment, in a section orthogonal to the axial direction of the rotary electric machine (sectional view taken along the line A-A in FIG. 1)

Hereinafter, a rotary electric machine according to a first embodiment of the invention will be described with reference to the accompanying drawings. A rotary electric machine (electric motor) 1 illustrated in FIG. 1 and FIG. 2 is used as a drive source for, for example, an electric vehicle or a hybrid vehicle. As illustrated in FIG. 1 and FIG. 2, the rotary electric machine 1 includes a tubular housing 2, a stator 3 accommodated in the housing 2, a rotor 4 disposed radially inward of the stator 3 so as to be opposed to the inner periphery of (the inner periphery of) the stator 3 across a gap, and a control device 5 that causes the stator 3 to generate a rotating magnetic field by supplying electric power to the stator 3. That is, the rotary electric machine 1 according to the present embodiment is configured as an inner rotor-type radial gap motor.

The housing 2 has a bottomed cylindrical housing body 6 of which one end (the right end in FIG. 1) is open, and a disc-shaped cover 7 disposed so as to close the open end of the housing body 6. An insertion hole 8 is formed at the center of a bottom portion 6a of the housing body 6 so as to pass through the bottom portion 6a in the axial direction, and an insertion hole 9 is formed at the center of the cover 7 so as to pass through the cover 7 in the axial direction.

The stator 3 includes a stator core 13 formed of a cylindrical portion 11 fixed to the inner periphery of a tubular portion 6b of the housing body 6 and multiple (twelve, in the present embodiment) teeth 12 that extend radially inward from the cylindrical portion 11. The stator core 13 is formed by laminating multiple magnetic steel sheets such as silicon steel sheets. Multiple (twelve, in the present embodiment) coils 15 are wound around the respective teeth 12. Connection end portions 15a of the coils 15 are drawn out of the housing 2 and connected to the control device 5.

The rotor 4 includes a cylindrical rotor core 22 fixed to a rotary shaft 21 so as to be rotatable together with the rotary shaft 21, and multiple pairs (four pairs, in the present embodiment) of embedded magnets 23a, 23b fixedly embedded in the rotor core 22. That is, the rotor 4 according to the present embodiment is configured as a so-called magnet embedded rotor.

Specifically, the rotary shaft 21 is formed in a columnar shape, and rotatably supported via bearings 24a, 24b disposed in the insertion hole 8 of the bottom portion 6a and the insertion hole 9 of the cover 7, respectively. The rotor core 22 has a core body 25 in which the embedded magnets 23a, 23b are embedded, and a pair of coupling members 26 fixedly coupled to respective ends of the core body 25 so as to be rotatable together with the rotary shaft 21. Each coupling member 26 is formed in an annular shape. The inner periphery of each coupling member 26, which defines a fitting hole 32 formed at the center of the coupling member 26, is press-fitted onto the outer periphery of the rotary shaft 21. Thus, the coupling members 26 are coupled to the rotary shaft 21 so as to be rotatable together with the rotary shaft 21. The core body 25 is formed by laminating multiple magnetic steel sheets, and each coupling member 26 is made of a non-magnetic material such as stainless steel.

As illustrated in FIG. 2, the core body 25 is formed as a relatively thick cylindrical member. Multiple pairs of hollow portions 31a, 31b in which the embedded magnets 23a, 23b are respectively disposed are formed in the core body 25 at equal angular intervals in the circumferential direction. Each hollow portion 31a is formed as a hole that passes through the core body 25 in the axial direction. As illustrated in an enlarged view in FIG. 2, the hollow portion 31a has a main hole section 31a1 in a rectangular sectional shape, of which the longitudinal direction extends along the radial direction, and holding hole sections 31a2 in a rectangular sectional shape, which extend from a radially inner end portion of the main hole section 31a1 to respective sides in the circumferential direction. Each hollow portion 31b as well as each hollow portion 31a has a main hole section 31b1 and holding hole sections 31b2.

Each embedded magnet 23a is formed of a main magnet 23a1 fitted in the main hole section 31a1 of the hollow portion 31a, and holding magnets 23a2 fitted in the holding hole sections 31a2. Each main magnet 23a1 is made of a segment magnet formed in a rectangular plate shape. The shape of the main magnet 23a1 in a section orthogonal to the axial direction of the rotor 4 is a rectangular shape corresponding to the sectional shape of the main hole section 31a1. Each holding magnet 23a2 is made of a segment magnet formed in a rectangular plate shape. The shape of the holding magnet 23a2 in a section orthogonal to the axial direction of the rotor 4 is a rectangular shape corresponding to the sectional shape of the holding hole section 31a2. The main magnets 23a1 are fitted in the main hole sections 31a1 and the holding magnets 23a2 are fitted in the holding hole sections 31a2, so that the embedded magnets 23a are fixed to the core body 25 (rotor core 22). Each embedded magnet 23b as well as each embedded magnet 23a is formed of a main magnet 23b1 and holding magnets 23b2. The main magnets 23b1 are fitted in the main hole sections 31b1 and the holding magnets 23b2 are fitted in the holding hole sections 31b2, so that the embedded magnets 23b are fixed to the core body 25.

The main magnets 23a1, 23b1 in one pair of the embedded magnets 23a, 23b are magnetized along their plate thickness direction (the direction substantially coincides with the circumferential direction of the rotor 4) such that the main magnets 23a1, 23b1 are opposed to each other at their magnetic poles having one polarity (for example, the north pole) in the circumferential direction. Thus, each main magnet 23a1 and the main magnet 23b1 disposed on one side of the main magnet 23a in the circumferential direction are opposed to each other at their magnetic poles having the one polarity (for example, the north pole), and the magnet 23a1 and the main magnet 23b1 disposed on the other side of the magnet 23a1 in the circumferential direction are opposed to each other at their magnetic poles having the other polarity (for example, south pole). That is, each main magnet 23a1 is magnetized such that the main magnet 23a1 and the main magnet 23b1 disposed on the one side of the magnet 23a1 in the circumferential direction are opposed to each other at their magnetic poles having the same polarity, and, in addition, the main magnet 23a1 and the main magnet 23b1 disposed on the other side of the magnet 23a1 in the circumferential direction are opposed to each other at their magnetic poles having the same polarity. Each embedded magnet 23a and the adjacent embedded magnet 23b disposed on one side of the embedded magnet 23a in the circumferential direction form a pair of the embedded magnets 23a, 23b, and, in addition, each embedded magnet 23a and the adjacent embedded magnet 23b disposed on the other side of the embedded magnet 23a in the circumferential direction form a pair of the embedded magnets 23a, 23b. Thus, eight rotor magnetic pole portions 33 interposed between the embedded magnets 23a, 23b are formed in the rotor core 22 by four pairs of the embedded magnets 23a, 23b. In addition, the rotor magnetic pole portions 33 having one polarity and the rotor magnetic pole portions 33 having the other polarity are arranged alternately in the circumferential direction. The rotor magnetic pole portions 33 are opposed to the teeth 12 of the stator 3 across a gap in the radial direction. The holding magnets 23a2, 23b2 are magnetized along their plate thickness direction (the direction substantially coincides with the circumferential direction of the rotor 4) such that their rotor magnetic pole portion 33-side magnetic poles have the same polarity as that of the corresponding rotor magnetic pole portions 33 (refer to FIG. 3).

As illustrated in FIG. 1, the control device 5 causes the stator 3 to generate a rotating magnetic field by supplying driving electric power in three phases to the coils 15 based on a d-axis current and a q-axis current in a two-phase rotating coordinate system (d/q coordinate system) in accordance with the rotation angle of the rotor 4. The d-axis current is a current for causing the stator 3 to generate a magnetic field in the magnetic flux direction (d-axis direction) of the rotor 4 (rotor magnetic pole portion 33), and the q-axis current is a current for causing the stator 3 to generate a magnetic field in a q-axis direction that is offset from the d-axis direction by 90° in electrical angle. In rotary electric machine 1, the rotor 4 is rotated based on the relationship between the rotating magnetic field generated by the stator 3 and magnetic flux that flows between the stator 3 and the rotor 4.

The configuration for varying the amount of magnetic flux of the rotor 4 (amount of magnetic flux that flows between stator 3 and rotor 4) will be described below. As illustrated in FIG. 1 and FIG. 2, the rotary electric machine 1 includes a cylindrical magnetic flux supply element 41 that is disposed radially inward of the rotor 4 across a gap, and that is rotatable relative to the rotor 4. The rotary electric machine 1 is configured such that the amount of magnetic flux of the rotor 4 is varied by changing the rotation angle of the magnetic flux supply element 41 relative to the rotor 4.

The magnetic flux supply element 41 includes a cylindrical supply element core 43, and a plurality of auxiliary magnets 44 fixed to the supply element core 43. In the magnetic flux supply element 41 according to the present embodiment, the auxiliary magnets 44 the number of which is equal to the number of the magnetic poles of the rotor 4 (the number of the rotor magnetic pole portions 33) are disposed.

The supply element core 43 is formed of a cylindrical support member 45, and a cylindrical magnet holding member 46 fixed to the outer periphery of the support member 45. The support member 45 is made of a magnetic material, and the magnet holding member 46 is formed by laminating a plurality of magnetic steel sheets. Opposite ends of the support member 45 are supported so as to be rotatable relative to the housing 2 and the rotor 4 via bearings 47*a*, 47*b* disposed on the outer periphery of the rotary shaft 21.

As illustrated in FIG. 2, in the magnet holding member 46, multiple hollow portions 48 in which the auxiliary magnets 44 are respectively disposed are formed at equal angular intervals in the circumferential direction. Each hollow portion 48 is formed as a hole extending in the axial direction and having a rectangular sectional shape, and formed such that the longitudinal direction of the rectangular sectional shape is substantially orthogonal to a radial line that passes through the center of the rectangular sectional shape in the longitudinal direction. As illustrated in the enlarged view in FIG. 2, each hollow portion 48 is formed such that its middle position in the circumferential direction is radially opposed to the middle position of the corresponding rotor magnetic pole portion 33 in the circumferential direction, and its opposite end portions in the longitudinal direction are radially opposed to the holding hole sections 31*a*2, 31*b*2 of the hollow portions 31*a*, 31*b* of the rotor 4.

Segment magnet formed in a rectangular plate shape is adopted as each auxiliary magnet 44. The shape of each auxiliary magnet 44 in a section orthogonal to the axial direction the rotor 4 is a rectangular shape corresponding to the sectional shape of each hollow portion 48, and the auxiliary magnets 44 are fixed to the supply element core 43 by being inserted into the hollow portions 48. That is, each auxiliary magnet 44 is formed such that its middle position in the circumferential direction is radially opposed to the middle position of the corresponding rotor magnetic pole portion 33 in the circumferential direction, and its opposite end portions in the longitudinal direction are radially opposed to the holding magnets 23*a*2, 23*b*2. The auxiliary magnets 44 are magnetized along their plate thickness direction (the direction substantially coincides with the radial direction of the rotor 4) such that the polarities of supply element magnetic pole portions 49 formed by the auxiliary magnets 44 alternate in the circumferential direction.

Figure 3A:
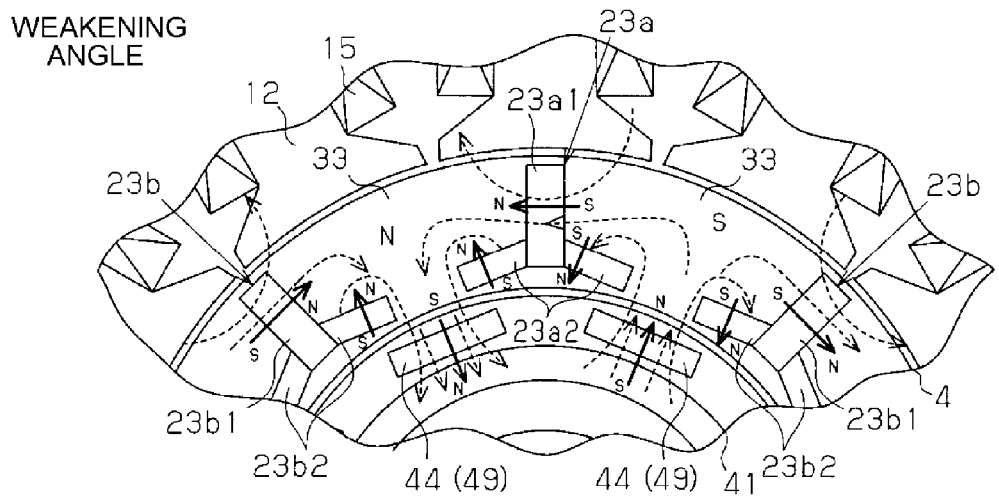
FIG. 3A is a view schematically illustrating flows of magnetic flux in the case where the rotation angle of a magnetic flux supply element relative to a rotor in the first embodiment is a weakening angle.

Therefore, as illustrated in FIG. 3A, at a weakening angle at which the polarity of each rotor magnetic pole portion 33 and the polarity of the magnetic pole of the supply element magnetic pole portion 49 (the auxiliary magnet 44), which is radially opposed to the rotor magnetic pole portion 33, are opposite to each other, part of the magnetic flux generated by the embedded magnets 23*a*, 23*b* does not flow between the stator 3 and the rotor 4, and flows between the rotor 4 and the magnetic flux supply element 41. Thus, the amount of magnetic flux of the rotor 4 (interlinkage flux with respect to the coils 15) decreases, and, as a result, it is possible to suppress an increase in the induced voltage, thereby allowing the rotor 4 to rotate at high speed. In the state where the magnetic flux supply element 41 is at a weakening angle, the polarity of each rotor magnetic pole portion 33 and the polarity of the corresponding supply element magnetic pole portion 49 are opposite to each other, and thus the relative rotation angle of the magnetic flux supply element 41 relative to the rotor 4 (hereinafter, referred to as "relative rotation angle of the magnetic flux supply element 41") is held by a magnetic attraction force acting between the rotor magnetic pole portions 33 and the supply element magnetic pole portions 49. Note that, in the drawings, the magnetization directions of the magnets are indicated by bold arrows, and the flows of magnetic flux are indicated by dashed arrows.

Figure 3B:
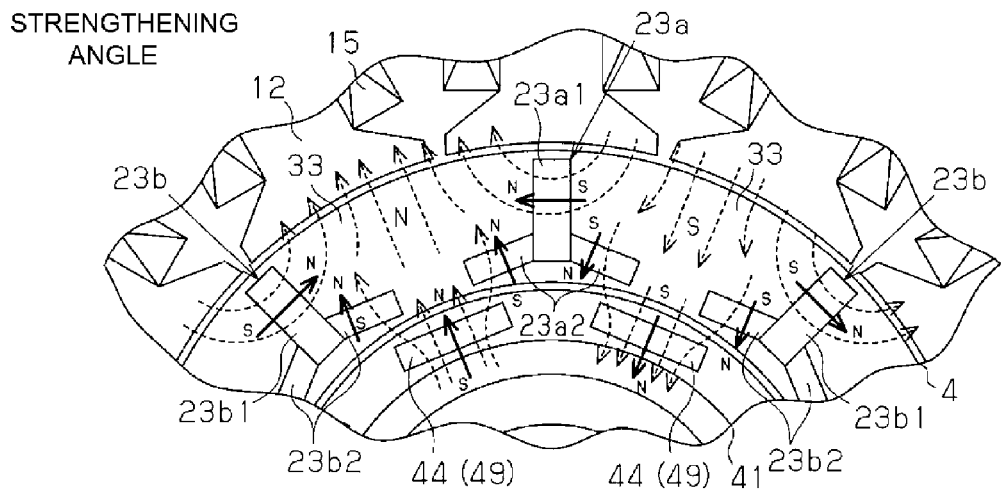
FIG. 3B is a view schematically illustrating flows of magnetic flux in the case where the rotation angle of the magnetic flux supply element relative to the rotor in the first embodiment is a strengthening angle.

On the other hand, as illustrated in FIG. 3B, when the relative rotation angle of the magnetic flux supply element 41 is a strengthening angle at which the polarity of each rotor magnetic pole portion 33 and the polarity of the magnetic pole of the supply element magnetic pole portion 49, which is radially opposed to the rotor magnetic pole portion 33, coincide with each other, the magnetic flux of the magnetic flux supply elements 41 is added to the magnetic flux of the embedded magnets 23*a*, 23*b*, which flows between the stator 3 and the rotor 4. Thus, the amount of magnetic flux of the rotor 4 increases, and, as a result, it is possible to generate high torque. In this state, the opposite end portions of each auxiliary magnet 44 in the circumferential direction are radially opposed to the holding magnets 23*a*2, 23*b*2 that are opposite in polarity to the end portions of the auxiliary magnet 44. That is, parts of each auxiliary magnet 44 are opposed to the magnetic poles of the corresponding embedded magnets 23*a*, 23*b*, the magnetic poles having the polarity opposite to that of the rotor magnetic pole portion 33-side magnetic poles. Thus, the relative rotation angle of the magnetic flux supply element 41 is held by the magnetic attraction force acting between the auxiliary magnets 44 and the embedded magnets 23*a*, 23*b* (holding magnets 23*a*2, 23*b*2).

Figure 4:
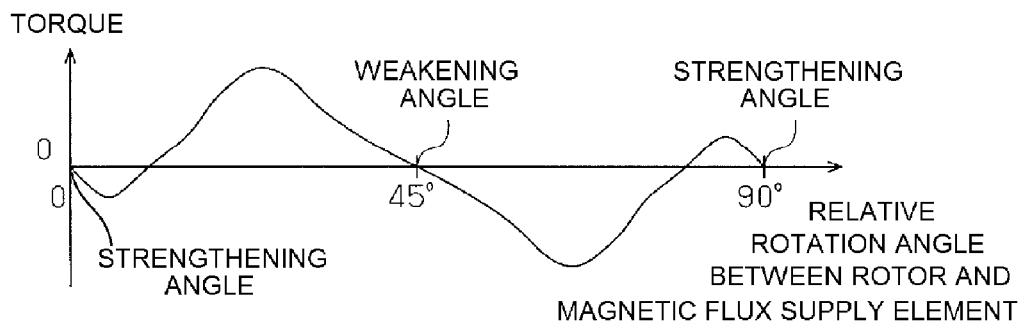
FIG. 4 is a graph illustrating the relationship between the rotation angle of the magnetic flux supply element relative to the rotor (hereinafter, referred to as "relative rotation angle of the magnetic flux supply element"), and the torque acting between the magnetic flux supply element and the rotor.

The torque acting between the rotor 4 and the magnetic flux supply element 41 configured as described above varies as illustrated in FIG. 4, and becomes zero at an angle at which the relative rotation angle of the magnetic flux supply element 41 becomes a weakening angle or a strengthening angle. In FIG. 4, the torque in a direction in which the magnetic flux supply element 41 is rotated clockwise relative to the rotor 4 is indicated by a positive value, and the torque in a direction in which the magnetic flux supply element 41 is rotated counterclockwise relative to the rotor 4 is indicated by a negative value.

A change (operation) in the relative rotation angle of the magnetic flux supply element 41 will be described below. The control device 5 instantaneously supplies the d-axis current to the coils 15 of the stator 3 and executes field weakening control or field strengthening control, thereby changing the relative rotation angle of the magnetic flux supply element 41. The control device 5 executes the field strengthening when changing the relative rotation angle of the magnetic flux supply element 41 from a weakening angle to a strengthening angle, and executes the field weakening control when changing the relative rotation angle of the magnetic flux supply element 41 from a strengthening angle to a weakening angle. The control device 5 according to the present embodiment sets a target value of the d-axis current to zero at the time of normal driving, that is, at times other than changing the relative rotation angle of the magnetic flux supply element 41.

In the state where the d-axis current is zero, the magnetic field generated at the stator 3 is generated along the q-axis direction that is offset from the magnetic flux direction (d-axis direction) of the rotor 4 by 90° in electrical angle. In this case, if the field weakening control is executed and the magnetic pole having the same polarity as that of the rotor magnetic pole portion 33 is generated in a portion of the stator 3, which is opposed to the rotor magnetic pole portion 33, the amount of magnetic flux that flows between the rotor 4 and the stator 3 decreases. In the state where the field weakening control is executed, the relative rotation angle of the magnetic flux supply element 41 is stably held at a weakening angle at which the amount of magnetic flux of the rotor 4 decreases. Therefore, if the field weakening control is executed when the relative rotation angle of the magnetic flux supply element 41 is a strengthening angle, the relative rotation angle of the magnetic flux supply element 41 is changed to a weakening angle.

Figure 5A:
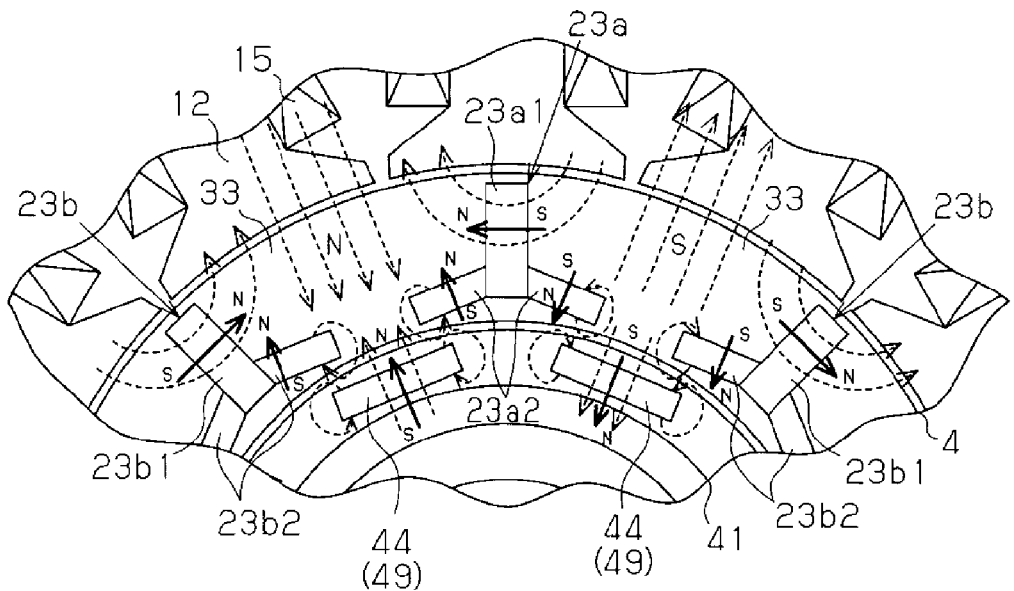
FIG. 5A is a view schematically illustrating flows of magnetic flux at the moment when field weakening control is executed in the case where the relative rotation angle of the magnetic flux supply element in the first embodiment is a strengthening angle.

Specifically, as illustrated in FIG. 5A, if the field weakening control is executed when the relative rotation angle of the magnetic flux supply element 41 is a strengthening angle (refer to FIG. 3B), in the rotor magnetic pole portions 33 of which the polarity is the north pole, part of the magnetic flux that has been flowing to the stator 3 side flows to the magnetic flux supply element 41 side, and, in the rotor magnetic pole portions 33 of which the polarity is the south pole, part of the magnetic flux that has been flowing to the magnetic flux supply element 41 side flows to the stator 3 side. Thus, repulsive force is generated by causing the magnetic flux to flow from the supply element magnetic pole portions 49 into the rotor magnetic pole portions 33 of which the polarity is the north pole, and repulsive force is generated by drawing the magnetic flux from the rotor magnetic pole portions 33 of which the polarity is the south pole into the supply element magnetic pole portions 49. As a result, the magnetic flux supply element 41 rotates relative to the rotor 4, so that the relative rotation angle of the magnetic flux supply element 41 is stably held at a weakening angle at which the polarity of each rotor magnetic pole portion 33 and the polarity of the supply element magnetic pole portion 49, which is radially opposed to the magnetic pole portion 33, are opposite to each other (refer to FIG. 3A).

On the other hand, if the field strengthening control is executed and the magnetic pole having the polarity opposite to that of the rotor magnetic pole portion 33 is generated in a portion of the stator 3, which is opposed to the rotor magnetic pole portion 33, the amount of magnetic flux that flows between the rotor 4 and the stator 3 increases. In the state where the field strengthening control is executed, the relative rotation angle of the magnetic flux supply element 41 is stably held at a strengthening angle at which the amount of magnetic flux of the rotor 4 increases. Therefore, if the field strengthening control is executed when the relative rotation angle of the magnetic flux supply element 41 is a weakening angle, the relative rotation angle of the magnetic flux supply element 41 is changed to a strengthening angle.

Figure 5B:
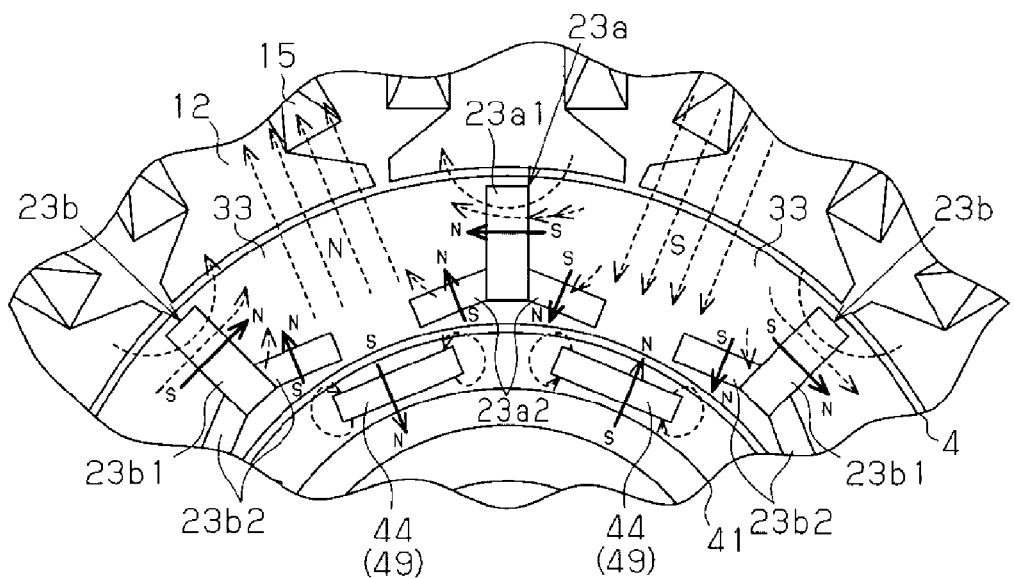
FIG. 5B is a view schematically illustrating flows of magnetic flux at the moment when field weakening control is executed in the case where the relative rotation angle of the magnetic flux supply element in the first embodiment is a weakening angle.

Specifically, as illustrated in FIG. 5B, if the field strengthening control is executed when the relative rotation angle of the magnetic flux supply element 41 is a weakening angle (refer to FIG. 3A), in the rotor magnetic pole portions 33 of which the polarity is the north pole, part of the magnetic flux that has been flowing to the magnetic flux supply element 41 side flows to the stator 3 side, and, in the rotor magnetic pole portions 33 of which the polarity is the south pole, part of the magnetic flux that has been flowing therein from the magnetic flux supply element 41 side flows therein from the stator 3 side. Thus, repulsive force is generated by drawing the magnetic flux from the rotor magnetic pole portions 33 of which the polarity is the north pole into the supply element magnetic pole portions 49, and repulsive force is generated by causing the magnetic flux to flow from the supply element magnetic pole portions 49 into the rotor magnetic pole portions 33 of which the polarity is the south pole. As a result, the magnetic flux supply element 41 rotates relative to the rotor 4, so that the relative rotation angle of the magnetic flux supply element 41 is stably held at a strengthening angle at which the polarity of each rotor magnetic pole portion 33 and the polarity of the supply element magnetic pole portion 49, which is radially opposed to the magnetic pole portion 33, coincide with each other (refer to FIG. 3B).

Advantageous effects produced by the present embodiment will be described below. Because the relative rotation angle of the magnetic flux supply element 41 can be changed by executing the field weakening control or the field strengthening control through the control of the d-axis current that is supplied to the coils 15 of the stator 3, it is not necessary to additionally provide a configuration for changing the relative rotation angle of the magnetic flux supply element 41. As a result, it is possible to simplify the configuration of the rotary electric machine 1.

Because the relative rotation angle of the magnetic flux supply element 41 is held at a weakening angle or a strengthening angle based only on the balance of the magnetic forces that act between the rotor 4 and the magnetic flux supply element 41, it is possible to further simplify the configuration of the rotary electric machine 1. Moreover, it is possible to reduce the absolute value of the d-axis current that is supplied to the coils 15 when the relative rotation angle of the magnetic flux supply element 41 is changed.

A rotary electric machine according to a second embodiment of the invention will be described with reference to the drawings. For convenience of description, the same configurations as those in the first embodiment will be denoted by the same reference symbols as those in the first embodiment, and description thereof will be omitted.

Figure 6:
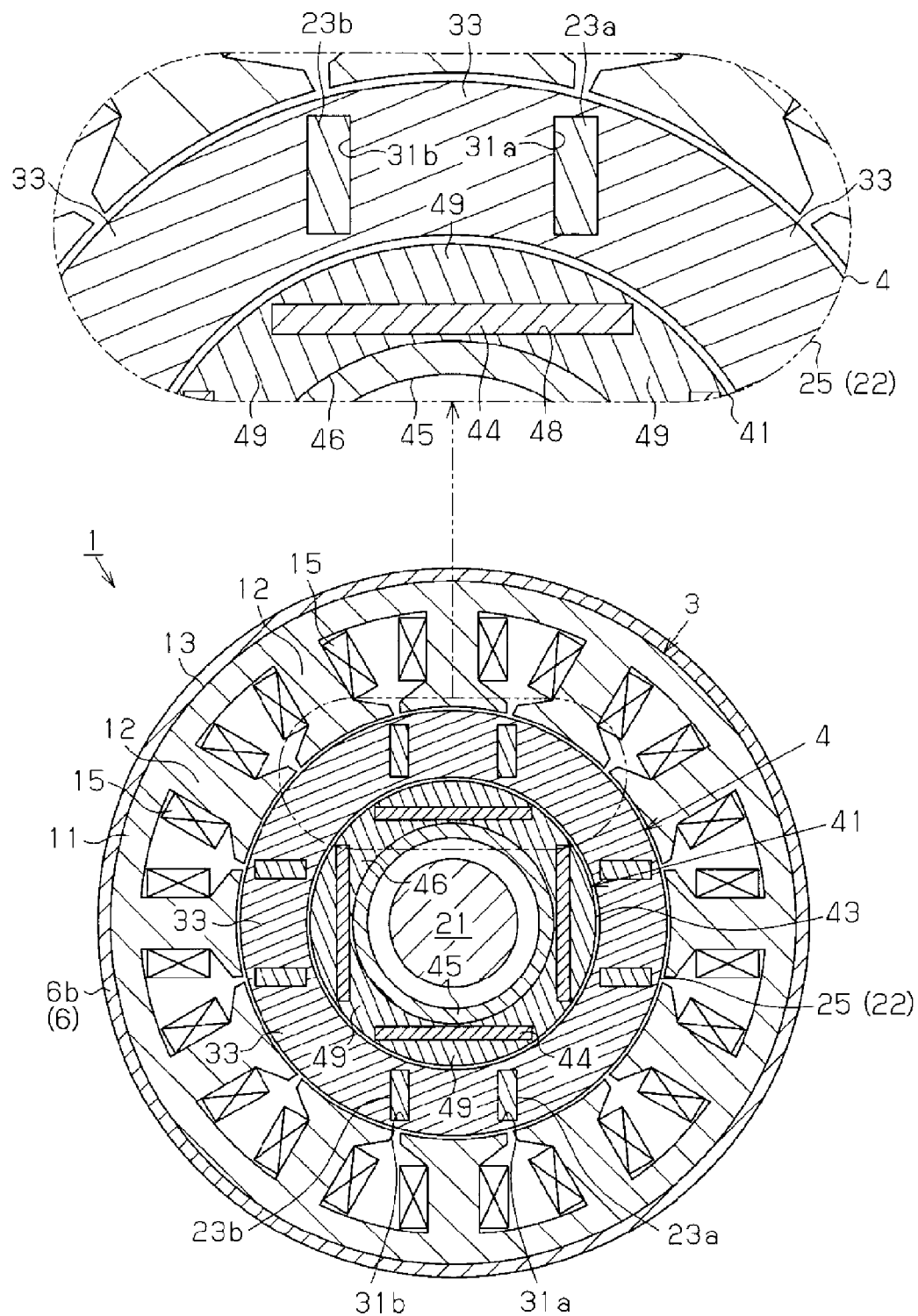
FIG. 6 is a sectional view of a rotary electric machine according to a second embodiment of the invention, in a section orthogonal to the axial direction of the rotary electric machine.

As illustrated in FIG. 6, hollow portions 31a, 31b of a rotor core 22 are respectively formed of only the main hole sections 31a1, 31b1 in the first embodiment. The shape of each of the hollow portions 31a, 31b in a section orthogonal to the axial direction of a rotor 4 is a rectangular shape. The hollow portion 31a and the hollow portion 31b are apart from each other in the circumferential direction, and formed such that the longitudinal directions of the rectangular sections thereof are substantially parallel to each other.

Embedded magnets 23a, 23b are respectively formed of only the main magnets 23a1, 23b1 in the first embodiment. The shapes of the embedded magnets 23a, 23b in a section orthogonal to the axial direction of the rotor 4 are rectangular shapes corresponding to the sectional shapes of the hollow portions 31a, 31b. The embedded magnets 23a, 23b are fixed to a core body 25 (rotor core 22) by being inserted into the hollow portions 31a, 3 1b. The embedded magnets 23a, 23b in one pair are magnetized along their plate thickness direction such that the embedded magnets 23a, 23b are opposed to each other at their magnetic poles having one polarity in the circumferential direction, as in the first embodiment. Thus, eight rotor magnetic pole portions 33 interposed between the embedded magnets 23a, 23b are formed in the rotor core 22 by four pairs of the embedded magnets 23a, 23b. In addition, the rotor magnetic pole portions 33 having one polarity and the rotor magnetic pole portions 33 having the other polarity are arranged alternately in the circumferential direction.

Auxiliary magnets 44 the number of which is half the number of the magnetic poles of the rotor 4 are disposed in a magnetic flux supply element 41 according to the present embodiment. Hollow portions 48 of a supply element core 43 (magnet holding member 46) are each formed as a hole having a rectangular section, and the length of the rectangular section in its longitudinal direction is set longer than the distance between the embedded magnets 23a, 23b in one pair. The shape of each auxiliary magnet 44 in a section orthogonal to its axial direction is a rectangular shape corresponding to the sectional shape of each hollow portion 48. The auxiliary magnets 44 are fixed to the supply element core 43 by being inserted into the hollow portions 48. Then, the auxiliary magnets 44 are magnetized along the radial direction such that only one polarity appears on the outer peripheral side of the supply element core 43. Thus, circumferential ranges in the supply element core 43, in which the auxiliary magnets 44 are disposed, are formed as the supply element magnetic pole portions 49 having one polarity, and circumferential ranges in the supply element core 43, which are located between the adjacent auxiliary magnets 44, are formed as the supply element magnetic pole portions 49 having the other polarity. That is, the magnetic flux supply element 41 according to the present embodiment is formed as a so-called half magnet-type (consequent pole-type) rotor.

Figure 7A:
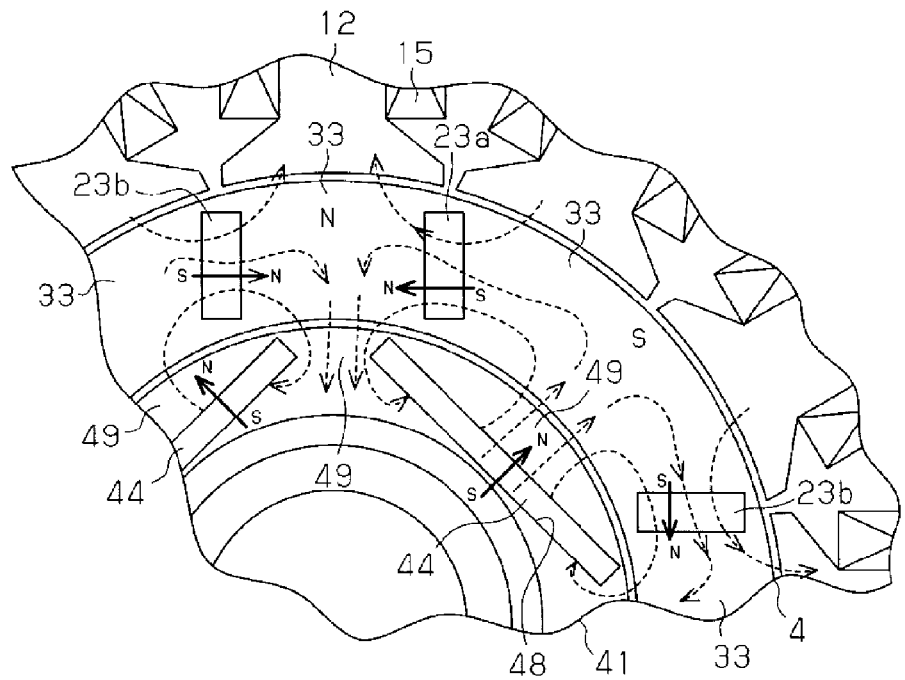
FIG. 7A is a view schematically illustrating flows of magnetic flux in the case where the relative rotation angle of a magnetic flux supply element in the second embodiment is a weakening angle.

Therefore, as illustrated in FIG. 7A, in the state where the relative rotation angle of the magnetic flux supply element 41 is a weakening angle, part of the magnetic flux generated by the embedded magnets 23a, 23b does not flow between the stator 3 and the rotor 4, and flows between the rotor 4 and the magnetic flux supply element 41. As a result, the amount of magnetic flux of the rotor 4 decreases. Further, in this state, the polarity of each rotor magnetic pole portion 33 and the polarity of the supply element magnetic pole portion 49 that is radially opposed to the rotor magnetic pole portion 33 are opposite to each other. Thus, the relative rotation angle of the magnetic flux supply element 41 is held by the magnetic attraction force that acts between the rotor magnetic pole portions 33 and the supply element magnetic pole portions 49.

Figure 7B:
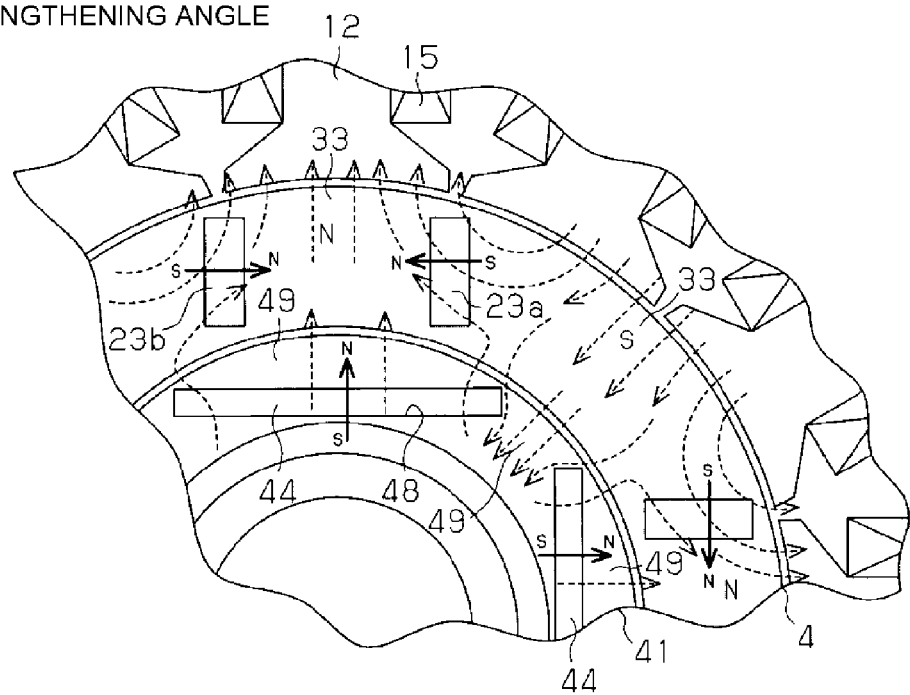
FIG. 7B is a view schematically illustrating flows of magnetic flux in the case where the relative rotation angle of the magnetic flux supply element in the second embodiment is a strengthening angle.

On the other hand, as illustrated in FIG. 7B, in the state where the relative rotation angle of the magnetic flux supply element 41 is a strengthening angle, the magnetic flux of the magnetic flux supply element 41 is added to the magnetic flux of the embedded magnets 23a, 23b that flows between the stator 3 and the rotor 4. As a result, the amount of magnetic flux of the rotor 4 increases. Further, in this state, each auxiliary magnet 44 extends over a range in the circumferential direction, which is wider than a range in the rotor 4 in the circumferential direction, in which a pair of the embedded magnets 23a, 23b is disposed. Thus, the relative rotation angle of the magnetic flux supply element 41 is held by the magnetic attraction force that acts between the opposite end portions of each auxiliary magnet 44 in the circumferential direction and the magnetic poles of the embedded magnets 23a, 23b having the polarity opposite to the polarity of the magnetic poles on the rotor magnetic pole portion 33 side.

The torque that acts between the rotor 4 and the magnetic flux supply element 41 configured as described above varies in a manner similar to that in the first embodiment (refer to FIG. 4), and becomes zero at an angle at which the relative rotation angle of the magnetic flux supply element 41 becomes a weakening angle or a strengthening angle. The relative rotation angle of the magnetic flux supply element 41 is changed by instantaneously supplying the d-axis current from the control device 5 to the coils 15 of the stator 3 and executing the field weakening control or the field strengthening control.

As described above, according to the present embodiment, it is possible to produce the advantageous effect similar to those in the first embodiment.

A rotary electric machine according to a third embodiment of the invention will be described with reference to the drawings. For convenience of description, the same configurations as those in the first embodiment will be denoted by the same reference symbols as those in the first embodiment, and description thereof will be omitted.

Figure 8:
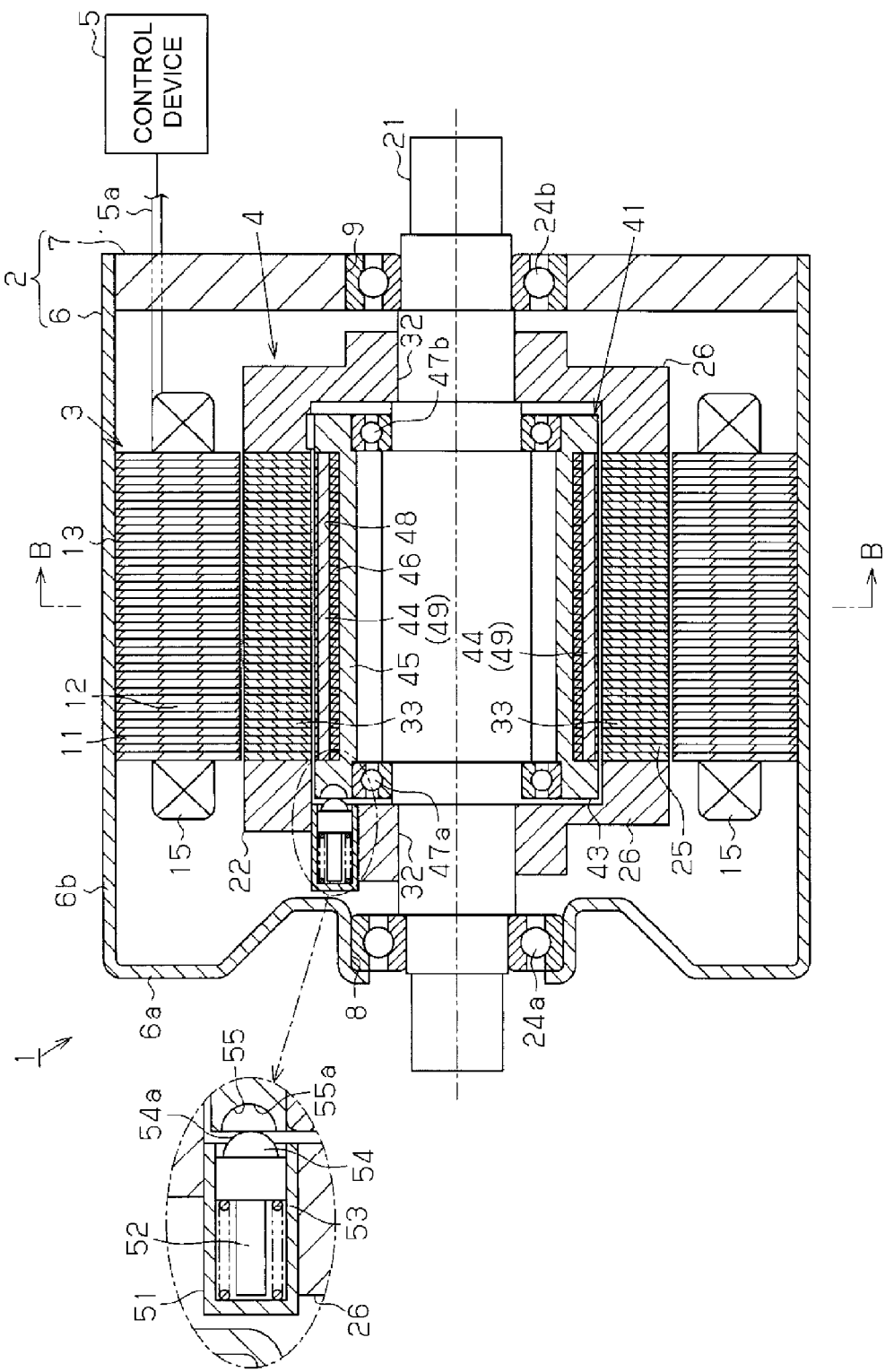
FIG. 8 is a sectional view of a rotary electric machine according to a third embodiment of the invention, taken along the axial direction of the rotary electric machine.
Figure 9:
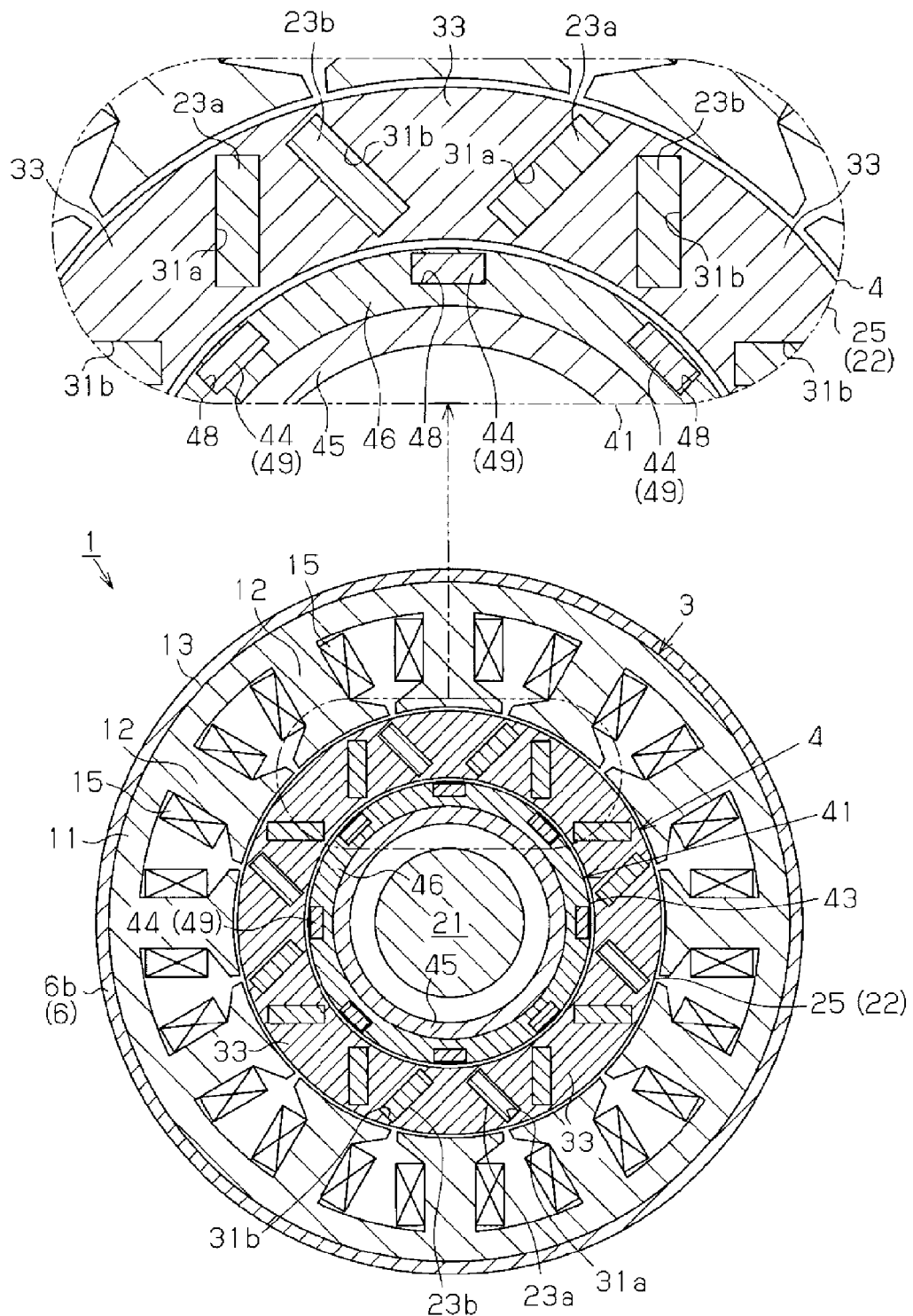
FIG. 9 is a sectional view of the rotary electric machine orthogonal to the axial direction of the rotary electric machine according to the third embodiment (sectional view taken along the line B-B in FIG. 8)

As illustrated in FIG. 8 and FIG. 9, multiple pairs of the hollow portions 31a, 31b are formed in a rotor core 22 according to the present embodiment. The number of the pairs of the hollow portions 31a, 31b is the same as the number of rotor magnetic pole portions 33. The hollow portions 31a, 31b are respectively formed of only the main hole sections 31a1, 31b1 in the first embodiment, and the shape of each of the hollow portions 31a, 31b in a section orthogonal to the axial direction is formed in a rectangular shape. The hollow portion 31a and the hollow portion 31b are apart from each other in the circumferential direction, and formed such that the longitudinal directions of the rectangular sections of the hollow portions 31a, 31b are inclined in the opposite directions with respect to the radial direction.

Embedded magnets 23a, 23b are respectively formed of only the main magnets 23a1, 23b1 in the first embodiment. The shape of each of the embedded magnets 23a, 23b in a section orthogonal to the axial direction of the rotor 4 is formed in a rectangular shape corresponding to the sectional shape of each of the hollow portions 31a, 31b. The embedded magnets 23a, 23b are fixed to a core body 25 (rotor core 22) by being inserted into the hollow portions 31a, 31b. The embedded magnets 23a, 23b are magnetized along their plate thickness direction such that the embedded magnets 23a, 23b are opposed to each other at their magnetic poles having one polarity (the north pole or the south pole) in the circumferential direction, and the rotor magnetic pole portions 33 in the rotor core 22, interposed between the embedded magnets 23a, 23b and having one polarity, and the rotor magnetic pole portions 33 in the rotor core 22, interposed between the embedded magnets 23a, 23b and having the other polarity, are arranged alternately in the circumferential direction. Thus, eight rotor magnetic pole portions 33 are formed in the rotor core 22 by eight pairs of the embedded magnets 23a, 23b.

Each auxiliary magnet 44 is formed such that the length of its section in the longitudinal direction is shorter than the distance between the embedded magnets 23a, 23b at a position at which the distance therebetween is shortest. That is, each auxiliary magnet 44 is formed so as not to be radially opposed to the embedded magnets 23a, 23b in the state where the magnetic flux supply element 41 is at a weakening angle or a strengthening angle.

The rotary electric machine 1 according to the present embodiment is provided with a holding structure for holding the relative rotation angle of the magnetic flux supply element 41 at a strengthening angle. As illustrated in FIG. 8, a bottomed cylindrical case 51 that opens toward the magnetic flux supply element 41 in the axial direction is fixed to the coupling member 26 of the rotor 4, which is on one side (left side in FIG. 8) in the axial direction. The case 51 accommodates a rod-like first holding member 52 and a coil spring 53 that may function as a holding-member urging member that urges the first holding member 52 toward the magnetic flux supply element 41. The case 51 is fixed to the coupling member 26 at a position in the circumferential direction, at which the case 51 is axially opposed to the rotor magnetic pole portion 33 having one polarity (for example, the north pole). A first engagement portion 54 in a convex shape is formed at the distal end of the first holding member 52. The first engagement portion 54 in the present embodiment is formed in a hemispherical shape, and a surface (outer surface) 54a of the first engagement portion 54 is inclined with respect to the circumferential direction (rotational direction) of the rotor 4. That is, in the present embodiment, the surface 54a may function as an inclined surface.

In an opposed surface of the support member 45, which is axially opposed to the coupling member 26, there are formed multiple (four, in the present embodiment) second engagement portions 55 in a concave shape, with which the first engagement portion 54 is engaged. In the present embodiment, the support member 45 is formed as a second holding member. Each second engagement portion 55 is formed in the support member 45, at a position in the circumferential direction, at which the second engagement portion 55 is axially opposed to the auxiliary magnet 44 disposed such that its magnetic pole having one polarity faces outward in the radial direction. A surface 55a (inner surface) of each second engagement portion 55 is formed in such a hemispherical shape that the substantially entire surface 54a of the first engagement portion 54 comes into contact with the surface 55a of the second engagement portion 55, and is inclined with respect to the circumferential direction (rotational direction) of the rotor 4. That is, in the present embodiment, the surface 55a may function as an inclined surface.

When the relative rotation angle of the magnetic flux supply element 41 becomes a strengthening angle, the first holding member 52 is urged to be moved by the coil spring 53, and the first engagement portion 54, which is a projection, is engaged with the second engagement portion 55, which is a recess, so that the relative rotation angle of the magnetic flux supply element 41 is held. The magnitude of urging force of the coil spring 53 (proportional to the elastic modulus of the coil spring 53) is set to such a magnitude that, depending on the magnetic attraction force and the repulsive force that act between the embedded magnets 23a, 23b and the auxiliary magnets 44, the rotor 4 and the magnetic flux supply element 41 do not rotate relative to each other and the first engagement portion 54 and the second engagement portion 55 are not disengaged from each other.

A change (operation) in the relative rotation angle of the magnetic flux supply element 41 will be described below. As illustrated in FIG. 10A, in the state where the relative rotation angle of the magnetic flux supply element 41 is a weakening angle, the first engagement portion 54 of the first holding member 52 comes into contact with a flat portion of the opposed surface of the support member 45. In this state, if the field strengthening control is executed, the relative rotation angle of the magnetic flux supply element 41 becomes a strengthening angle as in the first embodiment. As a result, as illustrated in FIG. 10B, the first engagement portion 54 (projection) of the first holding member 52 is engaged with the second engagement portion 55 (recess) that is axially opposed to the first engagement portion 54, and the relative rotation angle of the magnetic flux supply element 41 is held at a strengthening angle.

As illustrated in FIG. 10B, if the field weakening control is executed in the state where the relative rotation angle of the magnetic flux supply element 41 is a strengthening angle, the magnetic flux supply element 41 rotates relative to the rotor, so that the relative rotation angle of the magnetic flux supply element 41 becomes a weakening angle, as in the first embodiment. In this state, because the surfaces 54a, 55a of the first and second engagement portions 54, 55 are inclined with respect to the circumferential direction as described above, if the rotor 4 and the magnetic flux supply element 41 rotate relative to each other, a pressing force in a direction opposite to the urging direction of the coil spring 53 acts on the first holding member 52. Thus, the first holding member 52 is pushed back into the case 51 against the urging force of the coil spring 53, so that the engagement between the first engagement portion 54 (projection) and the second engagement portion 55 (recess) is cancelled as illustrated in FIG. 10A, and the relative rotation angle of the magnetic flux supply element 41 becomes a weakening angle.

As described above, according to the present embodiment, it is possible to produce the following advantageous effect in addition to the advantageous effects in the first embodiment. When the relative rotation angle of the magnetic flux supply element 41 becomes a strengthening angle, the first engagement portion 54 (projection) of the first holding member 52 that rotates together with the rotor 4 and the second engagement portion 55 (recess) of the magnetic flux supply element 41 are engaged with each other, so that the relative rotation angle of the magnetic flux supply element 41 is held at a strengthening angle. As a result, it is possible to reliably hold the relative rotation angle of the magnetic flux supply element 41 at a strengthening angle.

A rotary electric machine according to a fourth embodiment of the invention will be described with reference to the drawings. For convenience of description, the same configurations as those in the first embodiment will be denoted by the same reference symbols as those in the first embodiment, and description thereof will be omitted.

Figure 11:
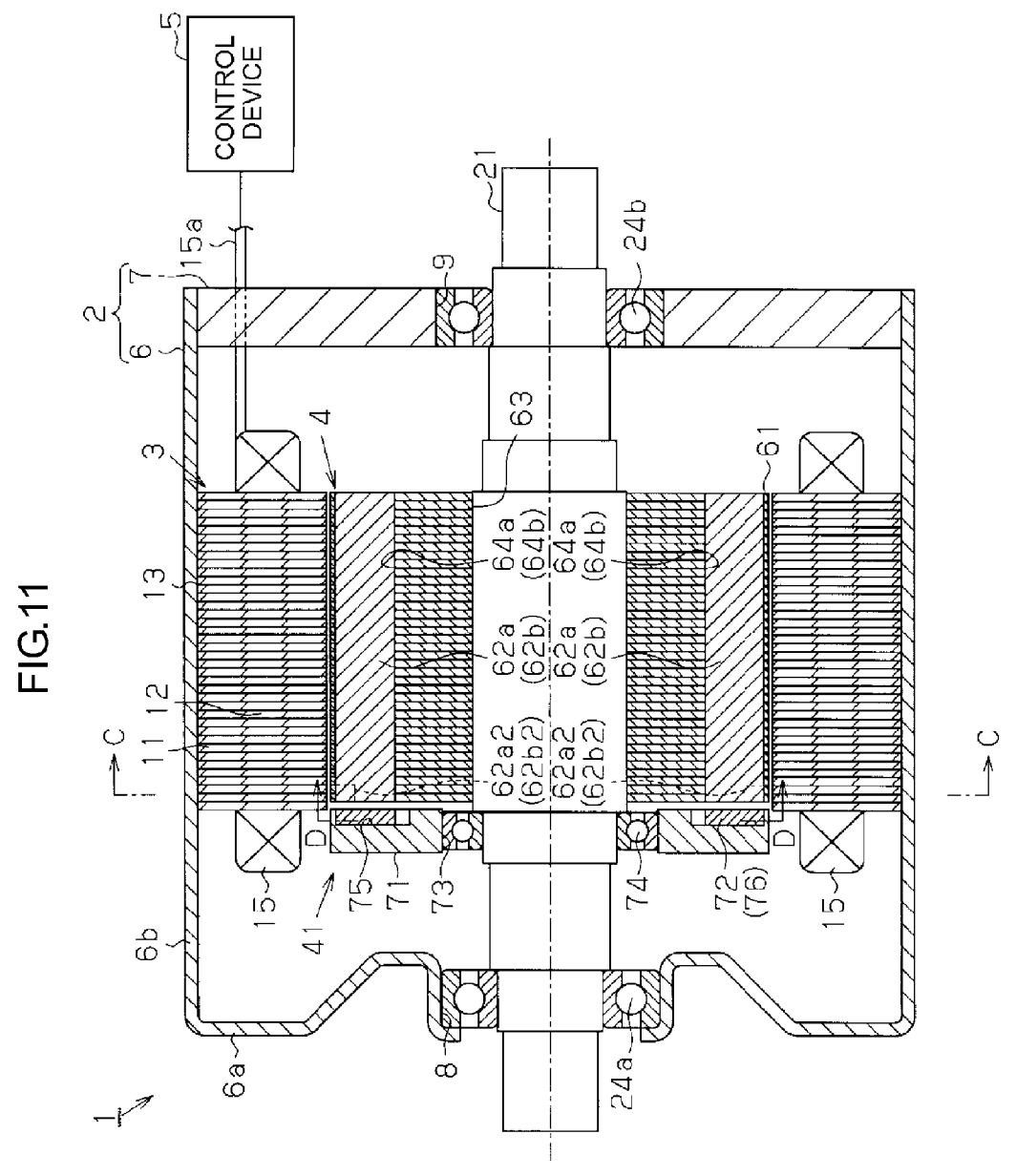
Figure 12:
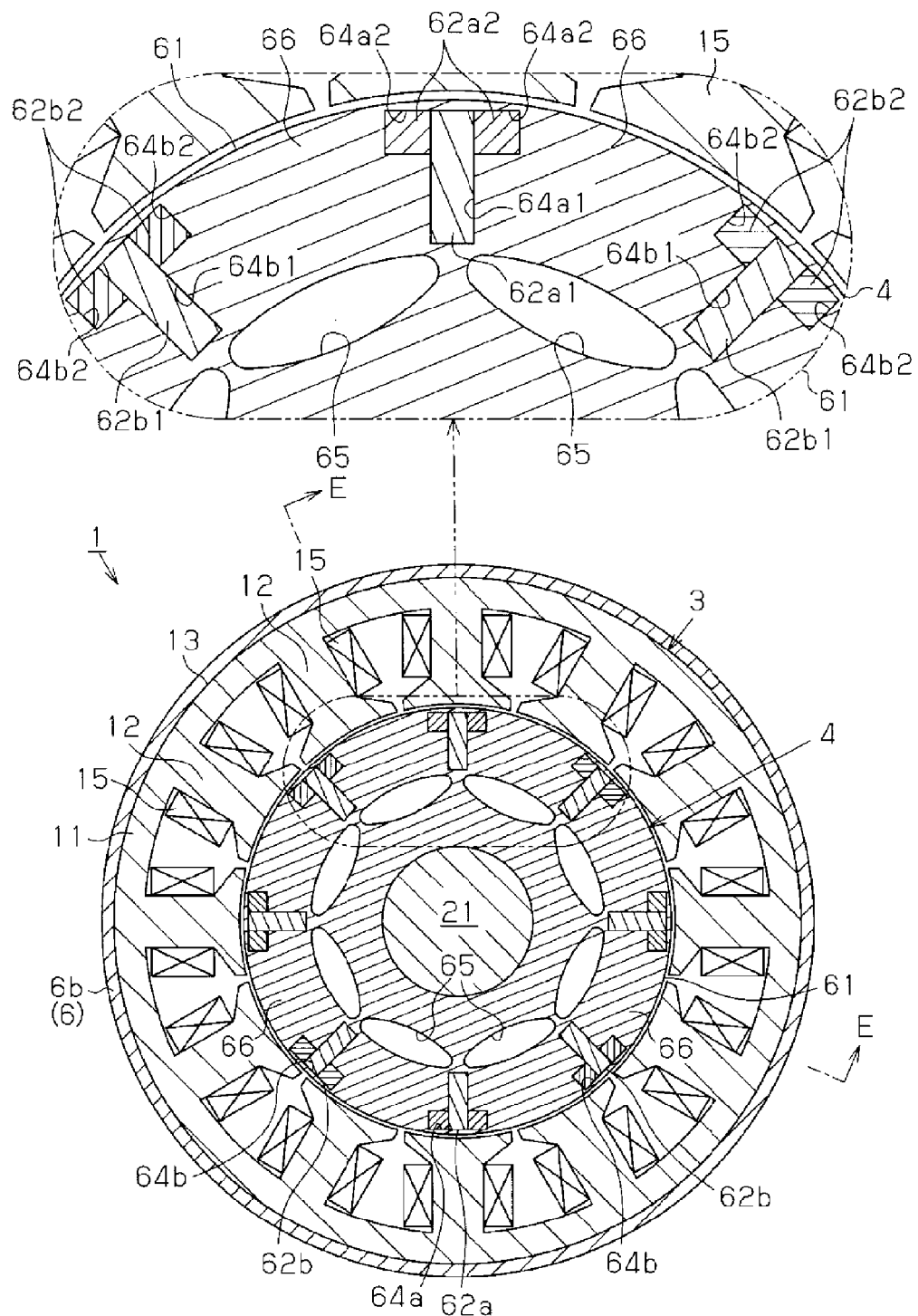
FIG. 12 is a sectional view of the rotary electric machine according to the fourth embodiment, in a section orthogonal to the axial direction of the rotary electric machine (sectional view taken along the line C-C in FIG. 11)

As illustrated in FIG. 11 and FIG. 12, a rotor 4 in the present embodiment includes a cylindrical rotor core 61 and multiple pairs (four pairs, in the present embodiment) of embedded magnets 62a, 62b that are fixedly embedded in the rotor core 61. A fitting hole 63 that passes through the rotor core 61 in the axial direction is formed at the center of the rotor core 61. The wall surface of the fitting hole 63 is fitted onto the outer periphery of a rotary shaft 21, so that the rotor core 61 is rotatable together with the rotary shaft 21. The rotor core 61 is formed by laminating a plurality of magnetic steel sheets.

As illustrated in FIG. 12, multiple pairs (four pairs, in the present embodiment) of hollow portions 64a, 64b in which the embedded magnets 62a, 62b are disposed are formed in the rotor core 61 at equal angular intervals in the circumferential direction. As illustrated in an enlarged view in FIG. 12, each hollow portion 64a is formed as a hole that passes through the rotor core 61 in the axial direction. Each hollow portion 64a has a main hole section 64a1 in a rectangular sectional shape, of which the longitudinal direction extends along the radial direction, and holding hole sections 64a2 in a square sectional shape, which extend from a radially outer end portion of the main hole section 64a1 (which extends from one end portion of the main hole section 64a1 in its axial direction) to respective sides in the circumferential direction. Each hollow portion 64b as well as each hollow portion 64a has a main hole section 64b1 and holding hole sections 64b2. In the rotor core 61 in the present embodiment, multiple voids 65 are formed to restrain the magnetic flux generated by the embedded magnets 62a, 62b disposed inside the hollow portion 64a, 64b from flowing to the inner peripheral side.

Each embedded magnet 62a is formed of a main magnet 62a1 fitted in the main hole section 64a1 of the hollow portion 64a, and holding magnets 62a2 fitted in the holding hole sections 64a2. Each main magnet 62a1 is made of a segment magnet formed in a rectangular plate shape. The shape of the main magnet 64a1 in a section orthogonal to the axial direction of the rotor 4 is a rectangular shape corresponding to the sectional shape of the main hole section 64a1. Each holding magnet 62a2 is made of a segment magnet formed in a thin rectangular plate shape. The shape of the holding magnet 62a2 in a section orthogonal to the axial direction of the rotor 4 is a rectangular shape corresponding to the sectional shape of the holding hole section 64a2. The main magnets 62a1 are fitted in the main hole sections 64a1 and the holding magnets 62a2 are fitted in the holding hole sections 64a2, so that the embedded magnets 62a are fixed to the rotor core 61. Each embedded magnet 62b as well as each embedded magnet 62a is formed of a main magnet 62b1 and holding magnets 62b2. The main magnets 62b1 are fitted in the main hole sections 64b1 and the holding magnets 62b2 are fitted in the holding hole sections 64b2, so that the embedded magnets 62b are fixed to the rotor core 61.

The main magnets 62a1, 62b1 in one pair of the embedded magnets 62a, 62b are magnetized along their plate thickness direction (the direction substantially coincides with the circumferential direction of the rotor 4) such that the main magnets 62a1, 62b1 are opposed to each other at their magnetic poles having one polarity in the circumferential direction. Thus, eight rotor magnetic pole portions 66 interposed between the embedded magnets 62a, 62b are formed in the rotor core 61 by four pairs of the embedded magnets 62a, 62b, as in the first embodiment. In addition, the rotor magnetic pole portions 66 having one polarity and the rotor magnetic pole portions 66 having the other polarity are arranged alternately in the circumferential direction. The holding magnets 62a2, 62b2 are magnetized along their plate thickness direction (the direction substantially coincides with the circumferential direction of the rotor 4) such that their rotor magnetic pole portion 66-side magnetic poles have the same polarity as that of the corresponding rotor magnetic pole portions 66.

Figure 13:
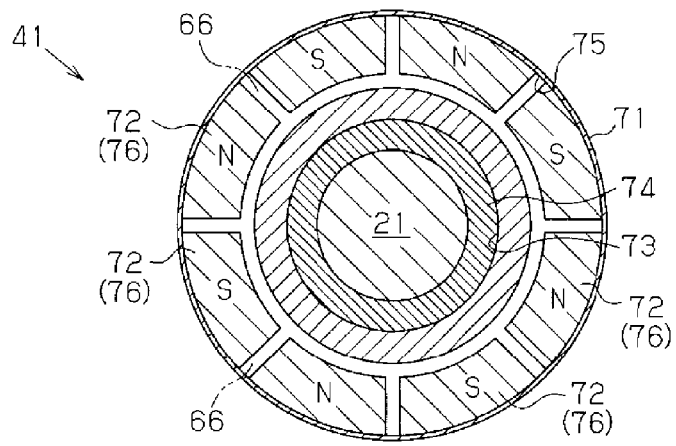
FIG. 13 is a sectional view of a magnetic flux supply element in the fourth embodiment, in a section orthogonal to the axial direction.

As illustrated in FIG. 11 and FIG. 13, the magnetic flux supply element 41 in the present embodiment is disposed on one end side of the rotor 4 in the axial direction across a gap, and is disposed so as to be rotatable relative to the rotor 4. The magnetic flux supply element 41 includes a disc-shaped supply element core 71 and a plurality of auxiliary magnets 72 fixed to the supply element core 71. The magnetic flux supply element 41 in the present embodiment is provided with the auxiliary magnets 72 the number of which is equal to the number of the rotor magnetic pole portions 66.

A through-hole 73 that passes through the supply element core 71 in the axial direction is formed at the center of the supply element core 71. The supply element core 71 is rotatably supported by the rotary shaft 21 via a bearing 74 disposed in the through-hole 73. An annular fixing groove 75 is formed in the opposed surface of the supply element core 71, which is opposed to the rotor 4. The supply element core 71 is made of a magnetic material.

As each auxiliary magnet 72, there is adopted a segment magnet having a sector plate shape in a section orthogonal to the axial direction of the rotor 4. The width of each auxiliary magnet 72 along the circumferential direction is substantially equal to the width of each rotor magnetic pole portion 66 along the circumferential direction. The auxiliary magnets 72 are fitted in the fixing groove 75 with a gap substantially the same as the plate thickness of each of the main magnets 62a1, 62b1 left between the adjacent auxiliary magnets 72, and with a gap left between each auxiliary magnet 72 and the inner peripheral side surface of the fixing groove 75. The auxiliary magnets 72 are magnetized along the axial direction such that supply element magnetic pole portions 76 formed by the auxiliary magnets 72 and having one polarity and supply element magnetic pole portions 74 formed by the auxiliary magnets 72 and having the other polarity are arranged alternately in the circumferential direction.

Figure 14A:
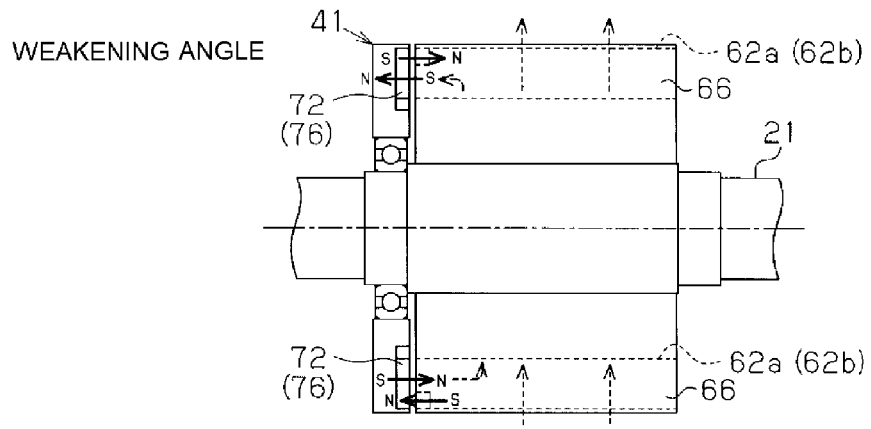
FIG. 14A is a view schematically illustrating flows of magnetic flux in the case where the relative rotation angle of the magnetic flux supply element in the fourth embodiment is a weakening angle, taken along the line E-E in FIG. 12.

Therefore, as illustrated in FIG. 14A, at a weakening angle at which the polarity of each rotor magnetic pole portion 66 and the polarity of the magnetic pole of the supply element magnetic pole portion 76 (the auxiliary magnet 72), which is axially opposed to the rotor magnetic pole portion 66, are opposite to each other, part of the magnetic flux generated by the embedded magnets 62a, 62b does not flow between the stator 3 and the rotor 4, and flows between the rotor 4 and the magnetic flux supply element 41. Thus, the amount of magnetic flux of the rotor 4 decreases, and, as a result, it is possible to suppress an increase in the induced voltage, thereby allowing the rotor 4 to rotate at high speed. In the state where the magnetic flux supply element 41 is at a weakening angle, the polarity of each rotor magnetic pole portion 66 and the polarity of the corresponding supply element magnetic pole portion 76 are opposite to each other, and thus the relative rotation angle of the magnetic flux supply element 41 relative to the rotor 4 is held by a magnetic attraction force acting between the rotor magnetic pole portions 66 and the supply element magnetic pole portions 76.

Figure 14B:
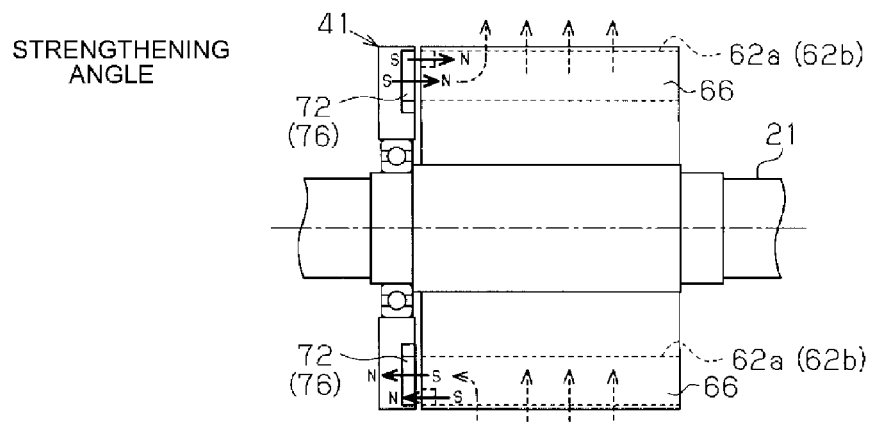
FIG. 14B is a view schematically illustrating flows of magnetic flux in the case where the relative rotation angle of the magnetic flux supply element in the fourth embodiment is a strengthening angle, taken along the line E-E in FIG. 12.

On the other hand, as illustrated in FIG. 14B, when the relative rotation angle of the magnetic flux supply element 41 is a strengthening angle at which the polarity of each rotor magnetic pole portion 66 and the polarity of the magnetic pole of the supply element magnetic pole portion 76, which is axially opposed to the rotor magnetic pole portion 66, coincide with each other, the magnetic flux of the magnetic flux supply elements 41 is added to the magnetic flux of the embedded magnets 62a, 62b, which flows between the stator 3 and the rotor 4. Thus, the amount of magnetic flux of the rotor 4 increases, and, as a result, it is possible to generate high torque. In this state, the opposite end portions of each auxiliary magnet 72 in the circumferential direction are radially opposed to the holding magnets 62a2, 62b2 that are opposite in polarity to the end portions of the auxiliary magnet 72. That is, parts of each auxiliary magnet 72 are opposed to the magnetic poles of the corresponding embedded magnets 62a, 62b, the magnetic poles having the polarity opposite to that of the rotor magnetic pole portion 66-side magnetic poles. Thus, the relative rotation angle of the magnetic flux supply element 41 is held by the magnetic attraction force acting between the auxiliary magnets 72 and the embedded magnets 62a, 62b (holding magnets 62a2, 62b2).

The torque acting between the rotor 4 and the magnetic flux supply element 41 configured as described above varies as in the first embodiment (refer to FIG. 4), and becomes zero at an angle at which the relative rotation angle of the magnetic flux supply element 41 becomes a weakening angle or a strengthening angle. The relative rotation angle of the magnetic flux supply element 41 is changed by instantaneously supplying the d-axis current from the control device 5 to the coils 15 of the stator 3 and executing the field weakening control or the field strengthening control. As described above, according to the present embodiment, it is possible to produce the advantageous effect similar to those in the first embodiment.

A rotary electric machine according to a fifth embodiment of the invention will be described with reference to the drawings. For convenience of description, the same configurations as those in the fourth embodiment will be denoted by the same reference symbols as those in the fourth embodiment, and description thereof will be omitted.

Figure 15:
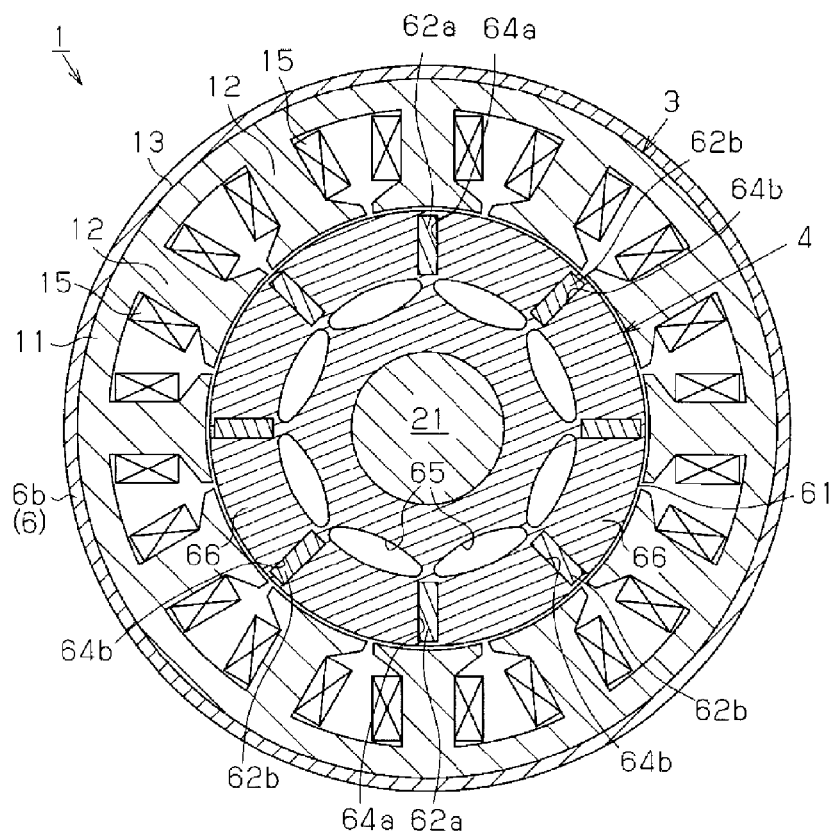
FIG. 15 is a sectional view of a rotary electric machine according to a fifth embodiment of the invention, in a section orthogonal to the axial direction of the rotary electric machine.

As illustrated in FIG. 15, hollow portions 64a, 64b of a rotor core 61 are respectively formed of only the main hole sections 64a1, 64b1 in the fourth embodiment. The shape of each of the hollow portions 64a, 64b in a section orthogonal to the axial direction is a rectangular shape of which the longitudinal direction extends along the radial direction.

Embedded magnets 62a, 62b are respectively formed of only the main magnets 62a1, 62b1 in the fourth embodiment. The shapes of the embedded magnets 62a, 62b in a section orthogonal to the axial direction of a rotor 4 are rectangular shapes corresponding to the sectional shapes of the hollow portions 64a, 64b. The embedded magnets 62a, 62b are fixed to the rotor core 61 by being inserted into the hollow portions 64a, 64b. The embedded magnets 62a, 62b in one pair are magnetized along their plate thickness direction such that the embedded magnets 62a, 62b are opposed to each other at their magnetic poles having one polarity in the circumferential direction, as in the first embodiment. Thus, eight rotor magnetic pole portions 66 interposed between the embedded magnets 62a, 62b are formed in the rotor core 61 by four pairs of the embedded magnets 62a, 62b.

Figure 16:
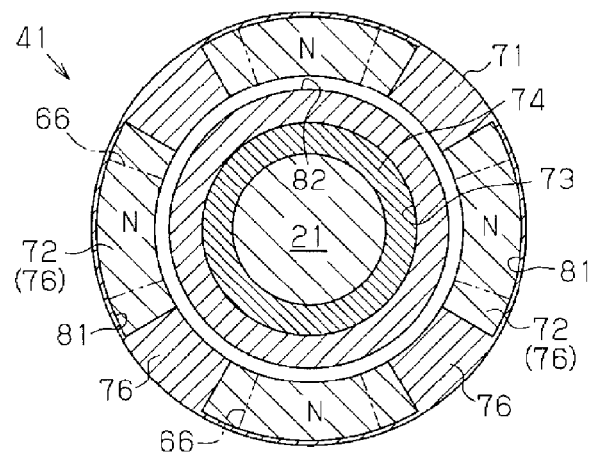
FIG. 16 is a sectional view of a magnetic flux supply element in the fifth embodiment, in a section orthogonal to the axial direction.

As illustrated in FIG. 16, sector-shaped fixing recessed portions 81 are formed in the opposed surface of the supply element core 71 according to the present embodiment, which is opposed to the rotor 4. The number of the fixing recessed portions 81 is half the number of the magnetic poles of the rotor 4. The width of each fixing recessed portion 81 along the circumferential direction is set larger than the sum of the width of the rotor magnetic pole portion 66 along the circumferential direction and the width of each of the main magnets 62a1, 62b1. A groove 82 that is continuous with the inner peripheral edge of each fixing recessed portion 81 is formed in the opposed surface of the supply element core 71, which is opposed to the rotor 4.

The shape of each auxiliary magnet 72 in a section orthogonal to the axial direction of the rotor 4 is a sector shape corresponding to the shape of each fixing recessed portion 81. The auxiliary magnets 72 are fixed to the supply element core 71 by being inserted into the fixing recessed portions 81. The auxiliary magnets 72 are magnetized along the axial direction such that only one polarity appears on the rotor 4 side. Thus, circumferential ranges in the supply element core 71, in which the auxiliary magnets 72 are disposed, are formed as the supply element magnetic pole portions 76 having one polarity, and circumferential ranges in the supply element core 71, which are located between the adjacent auxiliary magnets 72, are formed as the supply element magnetic pole portions 76 having the other polarity.

In the state where the magnetic flux supply element 41 is at a weakening angle, the polarity of each rotor magnetic pole portion 66 and the polarity of the corresponding supply element magnetic pole portion 76 are opposite to each other, and thus the relative rotation angle of the magnetic flux supply element 41 relative to the rotor 4 is held by a magnetic attraction force acting between the rotor magnetic pole portions 66 and the supply element magnetic pole portions 76. On the other hand, in the state where the relative rotation angle of the magnetic flux supply element 41 is at a strengthening angle, each auxiliary magnet 72 extends over a range in the circumferential direction, which is wider than a range in the rotor 4 in the circumferential direction, in which a pair of the embedded magnets 62a, 62b is disposed. Thus, the relative rotation angle of the magnetic flux supply element 41 is held by the magnetic attraction force that acts between the opposite end portions of each auxiliary magnet 72 in the circumferential direction and the magnetic poles of the embedded magnets 62a, 62b having the polarity opposite to the polarity of the magnetic poles on the rotor magnetic pole portion 66 side. The torque that acts between the rotor 4 and the magnetic flux supply element 41 configured as described above varies in a manner similar to that in the first embodiment (refer to FIG. 4), and becomes zero at an angle at which the relative rotation angle of the magnetic flux supply element 41 becomes a weakening angle or a strengthening angle. The relative rotation angle of the magnetic flux supply element 41 is changed by instantaneously supplying the d-axis current from the control device 5 to the coils 15 of the stator 3 and executing the field weakening control or the field strengthening control.

As described above, according to the present embodiment, it is possible to produce the advantageous effect similar to those in the first embodiment.

A rotary electric machine according to a sixth embodiment of the invention will be described with reference to the drawings. For convenience of description, the same configurations as those in the fourth embodiment will be denoted by the same reference symbols as those in the fourth embodiment, and description thereof will be omitted. A rotor core 61 in the present embodiment has a configuration similar to that of the rotor core 61 in the fifth embodiment, and a magnetic flux supply element 41 has a configuration similar to that of the magnetic flux supply element 41 in the fourth embodiment. The rotary electric machine 1 is provided with a holding structure for holding the relative rotation angle of the magnetic flux supply element 41 at a strengthening angle, as in the third embodiment. For convenience of description, the same configurations as those in the third embodiment will be denoted by the same reference symbols as those in the third embodiment.

Figure 17:
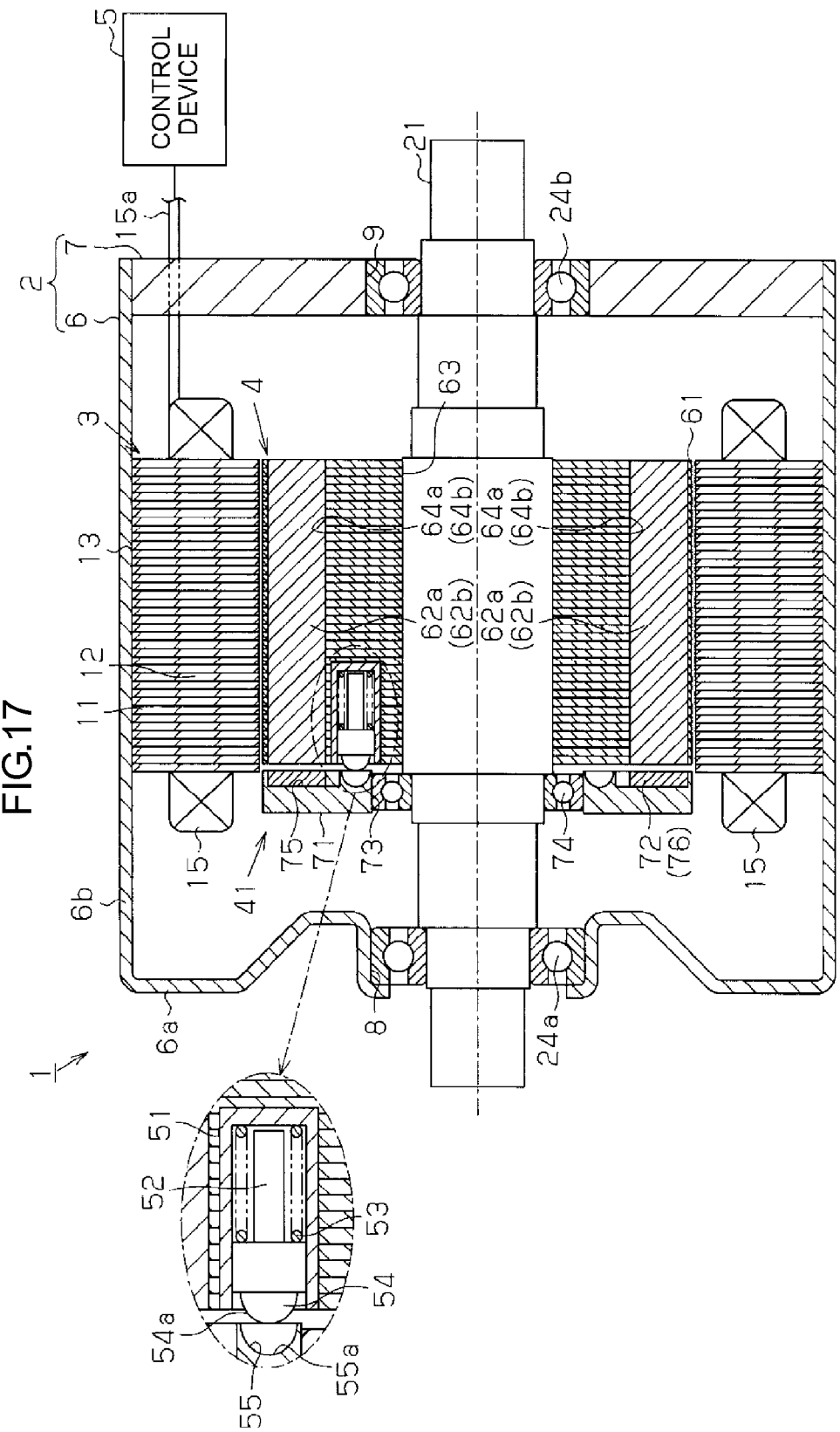
FIG. 17 is a sectional view of a rotary electric machine according to a sixth embodiment of the invention, taken along the axial direction of the rotary electric machine.

Specifically, as illustrated in FIG. 17, a case 51 that accommodates a first holding member 52 and a coil spring 53 is fixed to a radially inner side portion of a rotor core 61, at a position at which the case 51 is axially opposed to the rotor magnetic pole portion 66 having one polarity (for example, the north pole).

In an opposed surface of the supply element core 71, which is axially opposed to the rotor core 61, there are formed multiple (four, in the present embodiment) second engagement portions 55 with which the first engagement portion 54 of the first holding member 52 is engaged. Each second engagement portion 55 is formed in the supply element core 71, at a position in the circumferential direction, at which the second engagement portion 55 is radially opposed to the supply element magnetic pole portion 76 having one polarity. In the present embodiment, the supply element core 71 is formed as the second holding member.

In the rotary electric machine 1 configured as described above, in the state where the relative rotation angle of the magnetic flux supply element 41 is a weakening angle, the polarity of each rotor magnetic pole portion 66 and the polarity of the corresponding supply element magnetic pole portion 76 are opposite to each other, and thus the relative rotation angle of the magnetic flux supply element 41 is held by a magnetic attraction force acting between the rotor magnetic pole portions 66 and the supply element magnetic pole portions 76. In this case, the first engagement portion 54 of the first holding member 52 comes into contact with a flat portion of the opposed surface of the rotor core 61 (refer to FIG. 10A). On the other hand, in the rotary electric machine 1, in the state where the relative rotation angle of the magnetic flux supply element 41 is a strengthening angle, the relative rotation angle of the magnetic flux supply element 41 is held by engaging the first engagement portion 54 (projection) of the first holding member 52 with the second engagement portion 55 (recess) that is axially opposed to the first engagement portion 54 (refer to FIG. 10B). The relative rotation angle of the magnetic flux supply element 41 is changed by instantaneously supplying the d-axis current from the control device 5 to the coils 15 of the stator 3 and executing the field weakening control or the field strengthening control.

A rotary electric machine according to a seventh embodiment of the invention will be described with reference to the drawings. For convenience of description, the same configurations as those in the fourth embodiment will be denoted by the same reference symbols as those in the fourth embodiment, and description thereof will be omitted.

Figure 18:
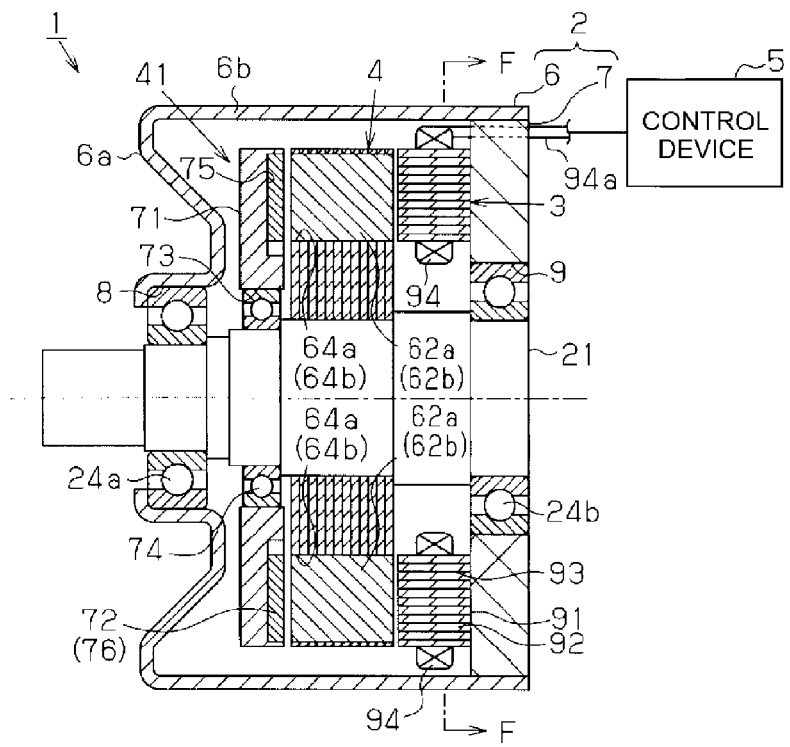
FIG. 18 is a sectional view of a rotary electric machine according to a seventh embodiment of the invention, taken along the axial direction of the rotary electric machine.

As illustrated in FIG. 18, a stator 3 is fixed to a cover 7 of a housing 2 with a gap left in the axial direction between the stator 3 and a rotor 4. The rotary electric machine 1 according to the present embodiment is formed as an axial gap motor.

Figure 19:
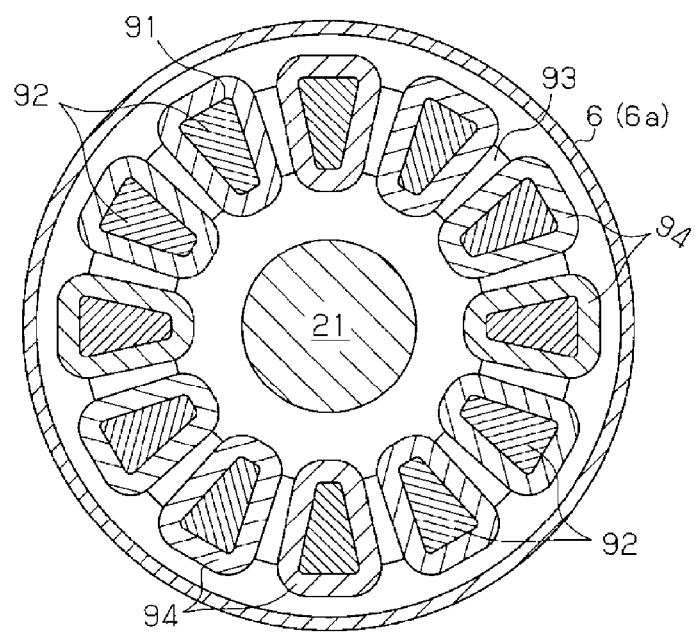
FIG. 19 is a sectional view of a stator in the seventh embodiment, in a section orthogonal to the axial direction of the stator (sectional view taken along the line F-F in FIG. 18)

Specifically, as illustrated in FIG. 18 and FIG. 19, the stator 3 includes a stator core 93 having an annular portion 91 and a plurality of teeth 92 that extend from the annular portion 91 in the axial direction, and coils 94 wound around the respective teeth 92. The teeth 92 are opposed to rotor magnetic pole portions 66 of the rotor 4 with a gap left between the teeth 92 and the rotor magnetic pole portions 66 in the axial direction. Connection end portions 94a of the coils 94 are drawn out of the housing 2 and connected to a control device 5. The rotor 4 and a magnetic flux supply element 41 have configurations similar to those in the fourth embodiment or the fifth embodiment.

The control device 5 causes the stator 3 to generate a rotating magnetic field by supplying driving electric power in three phases to the coils 94 based on a d-axis current and a q-axis current in a two-phase rotating coordinate system (d/q coordinate system) in accordance with the rotation angle of the rotor 4. In rotary electric machine 1, the rotor 4 is rotated based on the relationship between the rotating magnetic field generated by the stator 3 and magnetic flux that flows between the stator 3 and the rotor 4.

In the rotary electric machine 1 configured as described above, the relative rotation angle of the magnetic flux supply element 41 is changed by instantaneously supplying the d-axis current from the control device 5 to the coils 94 of the stator 3 and executing the field weakening control or the field strengthening control, as in the first embodiment.

As described above, according to the present embodiment, it is possible to produce the advantageous effects similar to those in the first embodiment. Note that, the above-described embodiments may be modified as follows.

In the first embodiment, the embedded magnets 23a, 23b are formed of the main magnets 23a1, 23b1 and the holding magnets 23a2, 23b2 which formed separately from the main magnets 23a1, 23b1. However, the configuration of the embedded magnets 23a, 23b is not limited to this. For example, the embedded magnets 23a, 23b may be formed as respective single-piece members in which the main magnets 23a1, 23b1 and the holding magnets 23a2, 23b2 are integrated with each other. Similarly, in the fourth embodiment, the embedded magnets 62a, 62b may be formed as respective single-piece members in which the main magnets 62a1, 62b1 and the holding magnets 62a2,62b2 are integrated with each other.

In the first and second embodiments, a holding structure for holding the relative rotation angle of the magnetic flux supply element 41 at a strengthening angle may be provided, as in the third embodiment. In the fourth and fifth embodiments, a holding structure for holding the relative rotation angle of the magnetic flux supply element 41 at a strengthening angle may be provided, as in the sixth embodiment.

Figure 20:
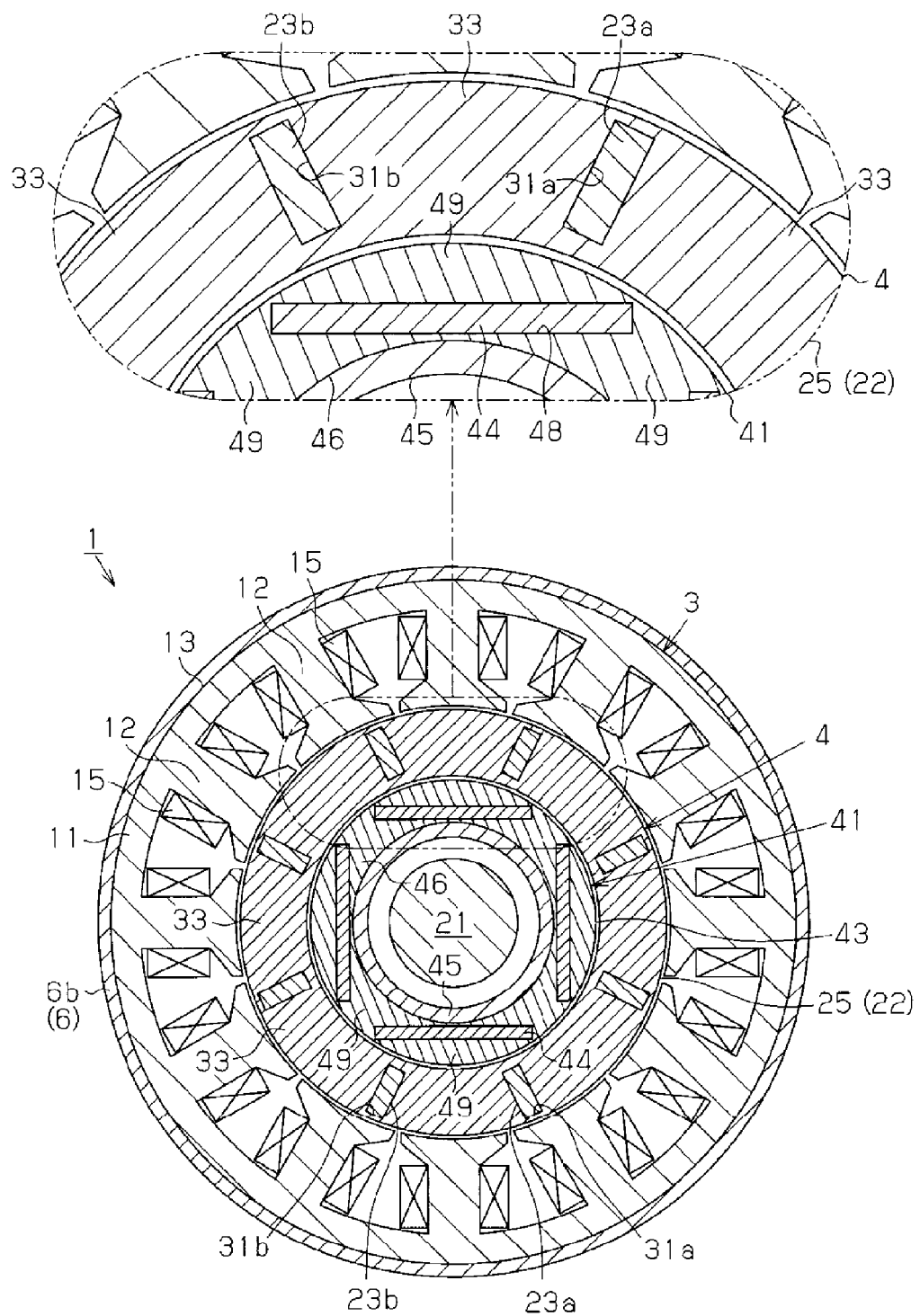
FIG. 20 is a sectional view of a rotary electric machine according to a modified example, in a section orthogonal to the axial direction of the rotary electric machine.

In the second embodiment, the embedded magnet 23a and the embedded magnet 23b are fixed to the rotor core 22 such that the longitudinal directions of their rectangular sections are parallel to each other. However, the configurations of the embedded magnets are not limited to this. For example, as illustrated in FIG. 20, the embedded magnet 23a and the embedded magnet 23b may be fixed to the rotor core 22 such that the longitudinal direction of their rectangular sections are inclined in the opposite directions with respect to the radial direction. In this case, each auxiliary magnet 44 need not extend over a range in the circumferential direction, which is wider than a range in the rotor 4 in the circumferential direction, in which a pair of the embedded magnets 23a, 23b is disposed, as long as parts of the auxiliary magnet 44 are opposed to the magnetic poles of the embedded magnets 23a, 23b having the polarity opposite to the polarity of the magnetic poles on the rotor magnetic pole portion 33 side, as illustrated in FIG. 20.

In the third and sixth embodiments, the first engagement portion 54 is formed in a convex shape, and the second engagement portion 55 is formed in a concave shape.

However, the shapes of the first engagement portion 54 and the second engagement portion 55 are not limited to these shapes. For example, the first engagement portion 54 may be formed in a concave shape, and the second engagement portion 55 may be formed in a convex shape.

In the third and sixth embodiments, the surfaces 54$a$, 55$a$ of the first and second engagement portions 54, 55 are each formed in a hemispherical shape. However, the shapes of the surfaces 54$a$, 55$a$ are not limited to a hemispherical shape. For example, the surfaces 54$a$, 55$a$ may be each formed in a conical shape, or the like. That is, as long as the surfaces 54$a$, 55$a$ are inclined with respect to the circumferential direction, and the surfaces 54$a$, 55$a$ are each in such a shape that, through the relative rotation between the rotor 4 and the magnetic flux supply element 41, pressing force in a direction opposite to the urging direction of the coil spring 53 acts on the first holding member 52 and the first engagement portion 54 and the second engagement portion 55 are disengaged from each other, and the shape of each of the surfaces 54$a$, 55$a$ may be changed as needed. One of the first and second engagement portions 54, 55 may have no inclined surface that is inclined with respect to the circumferential direction.

In the third embodiment, for example, the magnetic flux supply element 41 may be provided with the first holding member 52 and the coil spring 53, and the second engagement portion 55 may be formed in the coupling member 26 of the rotor 4. In this case, the coupling member 26 may function as the second holding member. Similarly, in the sixth embodiment, the magnetic flux supply element 41 may be provided with the first holding member 52 and the coil spring 53, and the second engagement portion 55 may be formed in the rotor core 61. In this case, the rotor core 61 may function as the second holding member.

In the third and sixth embodiments, the first holding member 52 is urged by the coil spring 53. However, the member that urges the first holding member 52 is not limited to the coil spring 53. For example, the first holding member 52 may be urged by another spring member such as a disc spring or an elastic body such as rubber.

In the fourth to sixth embodiments, the magnetic flux supply element 41 may be provided on each of both sides of the rotor 4 in the axial direction.

In the first to sixth embodiments, the rotary electric machine 1 is formed as an inner rotor-type radial gap motor. However, the rotary electric machine 1 is not limited to this. For example, the rotary electric machine 1 may be formed as an outer rotor-type radial gap motor.

In each embodiment described above, the auxiliary magnets 44, 72 are fixedly embedded in the rotor cores 22, 61. However, the configuration of the auxiliary magnets 44, 72 is not limited to this. For example, the auxiliary magnets 44, 72 may be fixed on the surfaces of the rotor cores 22, 61.

In each embodiment described above, a segment magnet is used as each of the auxiliary magnets 44, 72. However, the auxiliary magnets 44, 72 are not limited to segment magnets. For example, an annular ring magnet may be used. In this case, the auxiliary magnets 44, 72 may be rotatably supported on the radially inner side of the rotor 4 instead of being fixed to the supply element core 43. That is, the magnetic flux supply element 41 may be formed of only the auxiliary magnet.

In each embodiment described above, the auxiliary magnets 44, 72 the number of which is equal to the number of the magnetic poles of the rotor 4 (the number of the rotor magnetic pole portions 33, 66) are disposed in the magnetic flux supply element 41. However, the number of the auxiliary magnets 44, 72 may differ from the number of the magnetic poles of the rotor 4, and may be changed as appropriate.

In each embodiment described above, when the relative rotation angle of the magnetic flux supply element 41 is a weakening angle, the polarity of each of all the rotor magnetic pole portions 33, 66 and the polarity of the magnetic pole of a corresponding one of all the supply element magnetic pole portions 49, 76 are opposite to each other. However, the configuration is not limited to this. For example, the polarity of at least one of (for example, one) the supply element magnetic pole portions 49, 76 and the polarity of the rotor magnetic pole portion 33, 66 that is opposed to the supply element magnetic pole portion 49, 76 in the radial direction may coincide with each other.

Similarly, when the relative rotation angle of the magnetic flux supply element 41 is a strengthening angle, for example, the polarity of at least one of (for example, one) the supply element magnetic pole portions 49, 76 and the polarity of the rotor magnetic pole portion 33, 66 that is opposed to the supply element magnetic pole portion 49, 76 in the radial direction may be opposite to each other. It is needless to say that, when the relative rotation angle of the magnetic flux supply element 41 is a weakening angle or a strengthening angle, the middle positions of all the rotor magnetic pole portions 33, 66 in the radial direction and the middle positions of all the supply element magnetic pole portions 49, 76 in the radial direction need not completely coincide with each other.

In each embodiment described above, the invention is applied to the rotary electric machine 1 used as a drive source for an electric vehicle or a hybrid vehicle. However, the device to which the invention is applied is not limited to such a rotary electric machine. For example, the invention may be applied to a drive source for other systems such as an electric power steering system, and may be applied to a power generator.

What is claimed is:

1. A rotary electric machine comprising:
   a rotor including a rotor core fixed to a rotary shaft so as to be rotatable together with the rotary shaft, and multiple pairs of embedded magnets fixedly embedded in the rotor core and magnetized such that magnetic poles of the embedded magnets in each pair, the magnetic poles being opposed to each other in a circumferential direction of the rotor, have the same polarity;
   a stator including a stator core having teeth opposed to rotor magnetic pole portions each interposed between one of the pairs of the embedded magnets of the rotor core, and coils wound around the teeth;
   a control device that causes the stator to generate a rotating magnetic field by supplying electric power to the coils; and
   a magnetic flux supply element supported by the rotary shaft so as to be rotatable relative to the rotary shaft, and having supply element magnetic pole portions formed by auxiliary magnets fixed to the magnetic flux supply element, wherein
   a relative rotation angle of the magnetic flux supply element relative to the rotor during rotation of the rotor is (i) allowed to be held at a weakening angle at which a polarity of each of the rotor magnetic pole portions and a polarity of the supply element magnetic pole portion opposed to the rotor magnetic pole portion are opposite to each other, and wherein magnetic flux of the rotor decreases and the rotor is permitted to rotate at high speed, and (ii) allowed to be held at a strengthening angle at which the polarity of each of the rotor magnetic pole portions and the polarity of the supply element magnetic pole portion opposed to the rotor magnetic pole portion coincide with each other, and wherein the magnetic flux of the rotor increases and the rotor is capable of generating high torque, the control device controls a d-axis current to the coils of the stator, the d-axis current being a current in a direction of a magnetic flux of the rotor, and the control device is selectively operable to change the relative rotation angle of the magnetic flux supply element (a) from the weakening angle to the strengthening angle, and (b) from the strengthening angle to the weakening angle.

2. The rotary electric machine according to claim 1, wherein the relative rotation angle of the magnetic flux supply element is allowed to be held at the weakening angle or the strengthening angle based on a balance of magnetic forces acting between the rotor and the magnetic flux supply element.

3. The rotary electric machine according to claim 2, further comprising:
a first holding member that rotates together with one of the rotor and the magnetic flux supply element, and has a first engagement portion;
a second holding member that rotates together with the other one of the rotor and the magnetic flux supply element, and has a second engagement portion that holds the relative rotation angle of the magnetic flux supply element at the strengthening angle by being projection-recess engaged with the first engagement portion; and
a holding-member urging member that urges the first holding member toward the second holding member, wherein
at least one of the first and second engagement portions has an inclined surface that is inclined with respect to the circumferential direction, and
the inclined surface is formed such that projection-recess engagement between the first engagement portion and the second engagement portion is cancelled when the rotor and the magnetic flux supply element rotate relative to each other from a state where the relative rotation angle of the magnetic flux supply element is the strengthening angle.

4. The rotary electric machine according to claim 1, further comprising:
a first holding member that rotates together with one of the rotor and the magnetic flux supply element, and has a first engagement portion;
a second holding member that rotates together with the other one of the rotor and the magnetic flux supply element, and has a second engagement portion that holds the relative rotation angle of the magnetic flux supply element at the strengthening angle by being projection-recess engaged with the first engagement portion; and
a holding-member urging member that urges the first holding member toward the second holding member, wherein
at least one of the first and second engagement portions has an inclined surface that is inclined with respect to the circumferential direction, and
the inclined surface is formed such that projection-recess engagement between the first engagement portion and the second engagement portion is cancelled when the rotor and the magnetic flux supply element rotate relative to each other from a state where the relative rotation angle of the magnetic flux supply element is the strengthening angle.

5. The rotary electric machine according to claim 1, wherein:
the magnetic flux supply element is disposed with a gap left between the magnetic flux supply element and the rotor in a radial direction of the rotor; and
when the magnetic flux supply element is at the strengthening angle, parts of each of the auxiliary magnets are radially opposed to the magnetic poles of one of the pairs of the embedded magnets, the magnetic poles having the polarity opposite to that of the rotor magnetic pole portion-side magnetic poles.

6. The rotary electric machine according to claim 1, wherein:
the magnetic flux supply element is disposed with a gap left between the magnetic flux supply element and the rotor in an axial direction of the rotor; and
when the magnetic flux supply element is at the strengthening angle, parts of each of the auxiliary magnets are axially opposed to the magnetic poles of one of the pairs of the embedded magnets, the magnetic poles having the polarity opposite to that of the rotor magnetic pole portion-side magnetic poles.

7. The rotary electric machine according to claim 1, wherein each of the auxiliary magnets is formed so as to extend over a range in the circumferential direction, which is wider than a range in the rotor in the circumferential direction, in which one of the pairs of the embedded magnets is disposed in a state where the magnetic flux supply element is at the strengthening angle.

8. The rotary electric machine according to claim 1, wherein when the control device is selectively operable to change the relative rotation angle of the magnetic flux supply element, repulsive force is generated between the magnetic flux supply element and the rotor such that the magnetic flux supply element is permitted to rotate relative to the rotor.

* * * * *